United States Patent
Ji et al.

(10) Patent No.: US 11,445,472 B2
(45) Date of Patent: Sep. 13, 2022

(54) SIGNAL TRANSMISSION METHOD, NETWORK DEVICE, AND TERMINAL DEVICE

(71) Applicant: HUAWEI TECHNOLOGIES CO., LTD., Guangdong (CN)

(72) Inventors: Tong Ji, Beijing (CN); Yuwan Su, Beijing (CN); Xiaolei Tie, Shanghai (CN); Zhe Jin, Beijing (CN); Weiliang Zhang, Shanghai (CN)

(73) Assignee: Huawei Technologies Co., Ltd., Guangdong (CN)

( * ) Notice: Subject to any disclaimer, the term of this patent is extended or adjusted under 35 U.S.C. 154(b) by 74 days.

(21) Appl. No.: 16/700,530

(22) Filed: Dec. 2, 2019

(65) Prior Publication Data

US 2020/0107294 A1    Apr. 2, 2020

Related U.S. Application Data

(63) Continuation of application No. PCT/CN2017/087082, filed on Jun. 2, 2017.

(51) Int. Cl.
*H04W 4/00*    (2018.01)
*H04W 68/00*    (2009.01)
(Continued)

(52) U.S. Cl.
CPC ......... *H04W 68/005* (2013.01); *H04W 4/025* (2013.01); *H04W 52/0216* (2013.01);
(Continued)

(58) Field of Classification Search
CPC ... H04W 68/005; H04W 76/11; H04W 4/025; H04W 52/0216; H04W 72/042; H04W 72/1289
See application file for complete search history.

(56) References Cited

U.S. PATENT DOCUMENTS

2010/0279715 A1    11/2010    Alanara et al.
2012/0122495 A1*    5/2012    Weng ................. H04W 68/025
                                                                    455/458

(Continued)

FOREIGN PATENT DOCUMENTS

CN             1725870 A      1/2006
CN          101540628 A       9/2009
(Continued)

OTHER PUBLICATIONS

Huawei et al., "On "wake-up signal" for paging and connected-Mode DRX", 3GPP DRAFT, R1-1707021, XP051272251, May 14, 2017, 10 pages.

(Continued)

*Primary Examiner* — Siren Wei
(74) *Attorney, Agent, or Firm* — Fish & Richardson P.C.

(57) ABSTRACT

Example signal transmission methods and apparatus are described. One example method includes generating a first signal by a network device, where the first signal is used to indicate to a terminal device whether there is paging scheduling information on a first paging occasion. The network device determines a first resource based on at least one of a paging configuration parameter, a first parameter set, a terminal device identifier, or a terminal identification code. The network device sends the first signal to the terminal device on the first resource. The signal transmission methods, network device, and terminal device in the embodiments of this application enable the terminal device to determine, based on the first signal, whether to listen on a downlink control channel, reducing power consumption of the terminal device.

20 Claims, 5 Drawing Sheets

(51) Int. Cl.
*H04W 76/11* (2018.01)
*H04W 4/02* (2018.01)
*H04W 52/02* (2009.01)
*H04W 72/04* (2009.01)
*H04W 72/12* (2009.01)

(52) U.S. Cl.
CPC ..... *H04W 72/042* (2013.01); *H04W 72/1289* (2013.01); *H04W 76/11* (2018.02)

(56) References Cited

U.S. PATENT DOCUMENTS

| | | | |
|---|---|---|---|
| 2013/0303203 | A1 | 11/2013 | Wang et al. |
| 2013/0343362 | A1 | 12/2013 | Huang et al. |
| 2015/0103768 | A1 | 4/2015 | Chen et al. |
| 2016/0014716 | A1* | 1/2016 | Tabet ................ H04W 68/005 455/458 |
| 2016/0234804 | A1 | 8/2016 | Hu et al. |
| 2020/0099494 | A1 | 3/2020 | Yu et al. |

FOREIGN PATENT DOCUMENTS

| | | |
|---|---|---|
| CN | 102651908 A | 8/2012 |
| CN | 102970750 A | 3/2013 |
| CN | 103378939 A | 10/2013 |
| CN | 103532684 A | 1/2014 |
| CN | 105992342 A | 10/2016 |
| EP | 2257109 B1 | 1/2016 |
| KR | 20140103490 A | 8/2014 |
| KR | 20150105602 A | 9/2015 |
| KR | 20160142348 A | 12/2016 |
| WO | 2016070429 A1 | 5/2016 |

OTHER PUBLICATIONS

3GPP TS 36.211 V14.2.0 (Mar. 2017), 3rd Generation Partnership Project,Technical Specification Group Radio Access Network, Evolved Universal Terrestrial Radio Access (E-UTRA), Physical channels and modulation(Release 14), 197 pages.

Samsung, "Power consumpti on reducti on for paging and connected-mode DRX for NB-IOT", 3GPP DRAFT, R1-1705309, XP051243439, Apr. 2, 2017, 4 pages.

3GPP TS 36.213 V14.2.0 (Mar. 2017), 3rd Generation Partnership Project, Technical Specification Group Radio Access Network, Evolved Universal Terrestrial Radio Access (E-UTRA), Physical layer procedures(Release 14), 454 pages.

3GPP TS 36.300 V14.2.0 (Mar. 2017), 3rd Generation Partnership Project, Technical Specification Group Radio Access Network, Evolved Universal Terrestrial Radio Access (E-UTRA) and Evolved Universal Terrestrial Radio Access Network (E-UTRAN), Overall description, Stage 2(Release 14), 330 pages.

3GPP TS 36.304 V14.2.0 (Mar. 2017), 3rd Generation Partnership Project, Technical Specification Group Radio Access Network, Evolved Universal Terrestrial Radio Access (E-UTRA), User Equipment (UE) procedures in idle mode (Release 14), 49 pages.

3GPP TS 36.331 V14.2.2 (Apr. 2017),3rd Generation Partnership Project, Technical Specification Group Radio Access Network, Evolved Universal Terrestrial Radio Access (E-UTRA), Radio Resource Control (RRC), Protocol specification (Release 14), 720 pages.

Extended European Search Report issued in European Application No. 17911823.7 dated Apr. 6, 2020, 9 pages.

Office Action issued in Chinese Application No. 201780091180.0 dated Apr. 29, 2020, 13 pages (With English Translation).

PCT International Search Report and Written Opinion in International Application No. PCT/CN2017/087,082, dated Feb. 26, 2018, 15 pages (With English Translation).

Samsung, "Paging in NR—Beamforming Aspects," 3GPP TSG-RAN WG2 95bis, R2-166070, Kaohsiung, Taiwan, Oct. 10-14, 2016, 4 pages.

Office Action issued in Chinese Application No. 201780091180.0 dated Dec. 25, 2020, 6 pages.

Office Action issued in Korean Application No. 10-2019-7037788 dated Aug. 26, 2020, 10 pages (With English Translation).

* cited by examiner

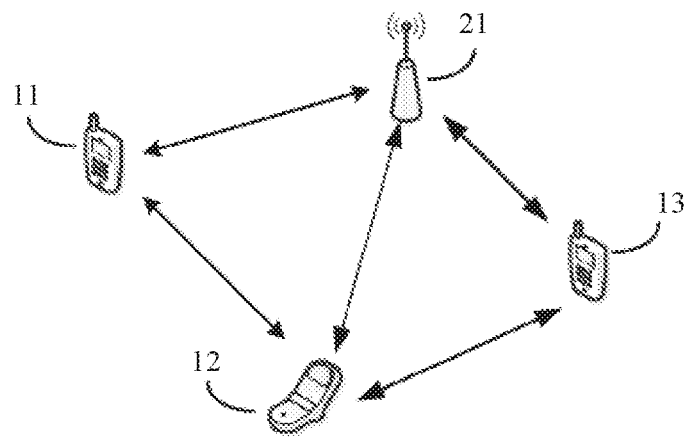

| A network device generates a first signal, where the first signal is used to indicate, to a terminal device, that there is a or there is no paging scheduling signal on a first paging occasion | ~ S210 |

| The network device determines a first resource based on at least one of a paging configuration parameter, a first parameter set, a terminal device identifier, or a terminal identification code | ~ S220 |

| The network device sends the first signal to the terminal device | ~ S230 |

FIG. 2

SIGNAL TRANSMISSION METHOD, NETWORK DEVICE, AND TERMINAL DEVICE

CROSS-REFERENCE TO RELATED APPLICATIONS

This application is a continuation of International Application No. PCT/CN2017/087082, filed on Jun. 2, 2017, the disclosure of which is hereby incorporated by reference in its entirety.

TECHNICAL FIELD

This application relates to the communications field, and more specifically, to a signal transmission method, a network device, and a terminal device.

BACKGROUND

In a wireless communications system, a terminal device usually has two modes: a connected mode and an idle mode (or a sleep mode). When the terminal device is in the idle mode, the terminal device cannot directly communicate with a network device. To ensure that the network device can effectively find the terminal device in the idle mode, the network device usually sends paging scheduling information to the terminal device in a paging manner, that is, periodically, to indicate whether the terminal device needs to be switched from the idle mode to the connected mode to communicate with the network device. After receiving the paging scheduling information, the terminal device may wake up to enter the connected state, to send or receive service data.

The terminal device in the idle mode periodically wakes up to listen to the paging scheduling information. A period of periodic wakeup is referred to as a discontinuous reception (Discontinuous Reception, DRX) period. A time point at which the terminal device wakes up is referred to as a paging occasion (Paging Occasion, PO), and one DRX period includes at least one PO. The terminal device in the idle mode remains in the idle mode at most time in a DRX period, and wakes up only at a corresponding PO to listen to the paging scheduling information. In a DRX period, the terminal device needs to wake up only on one PO to listen to the paging scheduling information.

However, in an internet of things (Internet of Things, IoT) system, services of many terminal devices are characterized by proactive reporting, that is, uplink-oriented, and there is a relatively low probability that the terminal device is paged. In addition, a system message (a useful system message except a conventional system frame number or the like) is not frequently changed. Therefore, most POs may be empty. To be specific, the network device does not send corresponding paging scheduling information on POs in most DRX periods. However, the terminal device still needs to wake up on a PO in each DRX period to listen to the paging scheduling information. This actually causes a power consumption waste. For example, if there is no paging scheduling information for a specific terminal device on a specific PO, the terminal device still needs to listen on a downlink control channel, and consequently a relatively large power consumption waste is caused. In addition, in some internet of things systems, a terminal device generally has a requirement for low power consumption, and therefore power consumption of the terminal device needs to be reduced as much as possible, to prolong a battery lifespan of the terminal device. Generally, it may be simply considered that the power consumption of the terminal device is directly proportional to a working (signal sending or receiving) rime of the terminal device.

In addition, in a communications system, in a DRX period, a plurality of terminal devices share one PO, in other words, the plurality of terminals listen to paging scheduling information at a same PO. In particular, in a scenario of a short DRX period, because a quantity of POs in DRX is usually not excessively large when the DRX is relatively short, a quantity of terminal devices that perform monitoring on a same PO is relatively large. When a plurality of terminal devices share one PO, even if there is paging scheduling information at the PO, the paging scheduling information may be specific to only a few terminal devices or even one terminal device of all the terminal devices that share the PO. However, another terminal device still needs to receive the paging scheduling information, and can determine, only after the another terminal device parses a paging message (the paging message is scheduled by using the paging scheduling information), that the another terminal device is not paged. Consequently, power consumption of the terminal device is increased, and a battery lifespan of the terminal device is shortened. Therefore, a new method urgently needs to be provided to avoid a power consumption waste.

SUMMARY

Embodiments of this application provide a signal transmission method, a network device, and a terminal device, to reduce power consumption of a terminal device.

According to a first aspect, a signal transmission method is provided, including:

generating, by a network device, a first signal, where the first signal is used to indicate to a terminal device that there is or there is no paging scheduling information on a first paging occasion;

determining, by the network device, a first resource based on at least one of a paging configuration parameter, a first parameter set, a terminal device identifier, or a terminal device identification code; and sending, by the network device, the first signal to the terminal device on the first resource.

In this embodiment of this application, the network device sends the first signal to the terminal device, where the first signal is used to indicate, to the terminal device, that there is or there is no paging scheduling information on the first paging occasion, so that the terminal device determines, based on the first signal, whether to listen on a downlink control channel, reducing power consumption of the terminal device.

Optionally, the paging configuration parameter includes at least one of a paging frame number, a paging period, a paging density, a paging frame quantity, or a quantity of paging occasions in a paging frame.

In some possible implementations, the first parameter set includes at least one of a period indication parameter of a first signal cluster, a start transmission location indication parameter of the first signal cluster, a quantity indication parameter, or a frequency domain resource location indication parameter of the first signal cluster, and the first signal cluster includes at least one signal.

Optionally, the period indication parameter of the first signal cluster is used to indicate a period of the first signal cluster.

The period indication parameter includes an explicit period indication parameter and/or an implicit period indication parameter, the explicit period indication parameter indicates an index number of a period value of the first signal cluster, and the implicit period indication parameter indicates at least one of a quantity of first signal clusters in one paging period or a ratio of a quantity of first signal clusters in one paging period to a quantity of paging occasions.

Optionally, the start transmission location indication parameter of the first signal cluster is used to indicate a start transmission location of the first signal cluster in time domain.

The start transmission location indication parameter indicates a relative location of the start transmission location of the first signal cluster to a second paging occasion, and the second paging occasion is the $1^{st}$ paging occasion of at least one paging occasion corresponding to the first signal cluster.

Optionally, the quantity indication parameter is used to indicate at least one of a quantity of first signals in a paging period, a quantity of first signal clusters in a paging period, or a quantity of first signals in a first signal cluster.

The quantity parameter indicates at least one of: an index number of the quantity of first signals in the paging period, an index number of the quantity of first signal clusters in the paging period, an index number of the quantity of first signals in the first signal cluster, a ratio of a quantity of paging occasions in the paging period to the quantity of first signals, a ratio of a quantity of paging occasions in the paging period to the quantity of first signal clusters, or a ratio of a quantity of paging occasions in a period of the first signal cluster to the quantity of first signals.

Optionally, the frequency domain resource location indication parameter of the first signal is used to indicate a frequency domain resource location of the first signal.

The frequency domain resource location indication parameter includes an explicit frequency domain resource location indication parameter and/or an implicit frequency domain resource location indication parameter, the explicit frequency domain resource location indication parameter indicates an index number of the frequency domain resource location, and the implicit frequency domain resource location indication parameter indicates a relative location of the frequency domain resource location of the first signal to a frequency domain resource location of the first paging occasion.

Optionally, each first signal in the first signal cluster may include a corresponding number or index. The first resource may correspond to a number of the first signal in the first signal cluster. After obtaining the number or the index of the first signal, the network device or the terminal device may learn of a corresponding resource location.

In some possible implementations, in one paging period, a quantity of first signals may be the same as or different from a quantity of POs.

Optionally, the network device may determine a PO by using the paging configuration parameter, and determine, by using the period indication parameter of the first signal cluster and the start transmission location indication parameter of the first signal cluster, a location of the $1^{st}$ first signal cluster that is before the PO. Optionally, the network device or the terminal device may determine, by using a first calculation rule, a corresponding number of a first signal in the $1^{st}$ first signal cluster that is before the PO, to determine the first resource.

Optionally, the corresponding number of the first signal may be determined by using a function of at least one of the paging configuration parameter or the quantity indication parameter. Optionally, the paging configuration parameter includes $PF_{SFN}$, T, nB, N, and Ns, and the quantity indication parameter includes $N_{wus}$, n, or the like. The network device may determine $PF_{SFN}$ by using T, N, and nB in the paging configuration parameter, and further determine the corresponding number of the first signal by using a function of at least one of $PF_{SFN}$, T, nB, $N_{wus}$, or n. $PF_{SFN}$ represents a system frame number corresponding to the PO, and is also referred to as a paging frame number, T represents a paging period of the terminal device, nB represents a paging density, $N_{wus}$ represents a quantity of first signals in the first signal cluster, and n represents that a quantity of POs in a period of the first signal cluster is n times of the quantity of first signals in the first signal cluster. In this way, the network device can determine the corresponding number of the first signal by calculating the function of $PF_{SFN}$, T, nB, $N_{wus}$, and n, to obtain the first resource corresponding to the corresponding number.

For example, in one paging period, a quantity of first signals may be less than a quantity of POs; in this case, one first signal corresponds to a plurality of POs. Optionally, the number of the first signal in the first signal cluster and the PO may meet the following formula:

$$w_{index} = \left\lfloor \left( \frac{(PF_{SFN} \bmod T)}{T/nB} \bmod (n \cdot N_{wus}) \right) / n \right\rfloor.$$

$W_{index}$ represents the number of the first signal in the first signal cluster, $\lfloor \ \rfloor$ represents a round-down operation, $PF_{SFN}$ represents a system frame number, to be specific, a system frame number corresponding to the first paging occasion, T represents a paging period of the terminal device, nB represents a paging density, $N_{wus}$ represents the quantity of first signals in the first signal cluster, n represents that a quantity of POs in a period of the first signal cluster is n times of the quantity of signals in the first signal cluster, and $$\frac{(PF_{SFN} \bmod T)}{T/nB} \bmod (n \cdot N_{wus})$$

represents a number of a PO in at least one PO corresponding to the first signal cluster. In this way, the network device can determine the number of the first signal based on the forgoing formula, to obtain the first resource.

Alternatively, optionally, the number of the first signal in the first signal cluster and the PO may meet the following formula:

$$w_{index} = \left\lfloor \left( \frac{(PF_{SFN} \bmod T)}{T/nB} \bmod (n \cdot N_{wus}) \right) \bmod N_{wus} \right\rfloor.$$

It should be understood that meanings of parameters in the formula are similar to those in the foregoing formula. For brevity, details are not described again. In this way, the network device can determine the number of the first signal based on the forgoing formula, to obtain the first resource.

In some possible implementations, the first resource is determined based on the paging configuration parameter, the first parameter set, and the terminal device identifier.

Herein, in one paging period, when a quantity of first signals may be greater than a quantity of POs, one PO corresponds to a plurality of first signals. In this case, the network device may determine, based on the paging configuration parameter, the first parameter set, and the terminal device identifier UEID, the first resource for sending the first signal. The network device may determine the PO by using the paging configuration parameter, and determine, by using the period indication parameter of the first signal cluster and the start transmission location indication parameter of the first signal cluster, a location of the $1^{st}$ first signal cluster that is before the PO. Optionally, the network device may determine, by using a second calculation rule, a corresponding number of a first signal in the $1^{st}$ first signal cluster that is before the PO, to determine the first resource.

Optionally, the corresponding number of the first signal may be determined by using a function of at least one of the paging configuration parameter, the quantity indication parameter, or the terminal device identifier. Optionally, the paging configuration parameter includes $PF_{SFN}$, T, nB, N, and Ns, the quantity indication parameter includes $N_{wus}$, n, and the like, $PF_{SFN}$ may be determined based on T, N, and nB in the paging configuration parameter, and the corresponding number is further determined by using a function of at least one of $PF_{SFN}$, T, nB, $N_{wus}$, n, or UEID. $PF_{SFN}$ represents a system frame number corresponding to the PO, and is also referred to as a paging frame number, T represents a paging period of the terminal device, nB represents a paging density, $N_{wus}$ represents a quantity of first signals in the first signal cluster, n represents that a quantity of POs in a period of the first signal cluster is n times of the quantity of first signals in the first signal cluster, and UEID represents the terminal device identifier. In this way, the network device can determine the corresponding number of the first signal by calculating the function of $PF_{SFN}$, T, nB, $N_{wus}$, n, and UEID, to obtain the first resource corresponding to the corresponding number.

Optionally, the number of the first signal in the first signal cluster and the terminal device identifier UEID may meet the following formula:

$$w_{index}^0 = \frac{(PF_{SFN} \bmod T)}{T/nB} \bmod(N_{wus}/n)$$

$$w_{index}^1 = \lfloor UEID/N \rfloor \bmod n$$

$$w_{index} = n \cdot w_{index}^0 + w_{index}^1.$$

$W_{index}$ represents the number of the first signal in the first signal cluster, $PF_{SFN}$ represents a system frame number corresponding to the first paging occasion, T represents a paging period of the terminal device, nB represents a paging density, $N_{wus}$ represents the quantity of first signals in the first signal cluster, n represents that a quantity of POs in a period of the first signal cluster is n times of the quantity of first signals in the first signal cluster, $w_{index}^0$ represents a number of the first paging occasion in at least one paging occasion, $w_{index}^1$ represents a number, in n first signals corresponding to one first paging occasion, of a first signal corresponding to a UEID, UEID represents the terminal device identifier, and a value of N is min(T, nB).

In some possible implementations, the first resource is determined based on the paging configuration parameter, the first parameter set, and the terminal device identification code. In this case, the network device may determine, based on the paging configuration parameter, the first parameter set, and the terminal identification code IMSI, the first resource for sending the first signal. The network device may determine a PO by using the paging configuration parameter, and determine, by using the period indication parameter of the first signal cluster and the start transmission location indication parameter of the first signal cluster, a location of the $1^{st}$ first signal cluster that is before the PO. Optionally, the network device may determine, by using a third calculation rule, a corresponding number of a first signal in the $1^{st}$ first signal cluster that is before the PO, to determine the first resource.

Optionally, the corresponding number of the first signal may be determined by using a function of at least one of the paging configuration parameter, the quantity indication parameter, or the terminal device identification code.

Herein, when a quantity of first signals may be greater than a quantity of POs, one PO corresponds to a plurality of first signals. Further, one terminal device identifier UEID corresponds to a plurality of terminal device identification codes IMSI. In this case, the network device may determine, based on the terminal device identification code IMSI, the first resource for sending the first signal.

Optionally, the paging configuration parameter includes $PF_{SFN}$, T, nB, N, and Ns, the quantity indication parameter includes $N_{wus}$, n, and the like, $PF_{SFN}$ may be determined based on T, N, and nB in the paging configuration parameter, and the corresponding number of the first signal is further determined by using a function of at least one of $PF_{SFN}$, T, nB, $N_{wus}$, n, or IMSI. $PF_{SFN}$ represents a system frame number corresponding to the PO, and is also referred to as a paging frame number, represents a paging period of the terminal device, nB represents a paging density, $N_{wus}$ represents a quantity of first signals in the first signal cluster, n represents that a quantity of POs in a period of the first signal cluster is n times of the quantity of first signals in the first signal cluster, and IMSI represents the terminal device identification code. In this way, the network device can determine the corresponding number of the first signal by calculating the function of $PF_{SFN}$, T, nB, $N_{wus}$, n, and IMSI, to obtain the first resource corresponding to the corresponding number.

Optionally, the number of the first signal in the first signal cluster and the terminal device identifier IMSI may meet the following formula:

$$w_{index}^0 = \frac{(PF_{SFN} \bmod T)}{T/nB} \bmod(N_{wus}/n)$$

$$w_{index}^1 = \lfloor IMSI \bmod M/C \rfloor \bmod n$$

$$w_{index} = n \cdot w_{index}^0 + w_{index}^1.$$

$w_{index}^0$ represents a number of the first paging occasion in at least one paging occasion, $w_{index}^1$ represents a number, inn first signals corresponding to one first paging occasion, of a first signal corresponding to a UEID, $PF_{SFN}$ represents a system frame number corresponding to the first paging occasion, T represents a paging period of the terminal device, nB represents a paging density, $N_{wus}$ represents a quantity of signals in the first signal cluster, n represents that a quantity of first paging occasions in a period of the first signal cluster is n times of the quantity of signals in the first signal cluster, IMSI represents the terminal device identification code corresponding to the terminal device, and $W_{index}$ represents the number of the first signal in the first signal cluster. A value of M is a positive integer, and a value range of M may be large enough. When the value of M is large enough, IMSI mod M is approximately equal to IMSI. A value of C is a positive integer, is preferably an integer multiple of 2, and may be 1024, 4096, or another possible value. This is not limited.

In some possible implementations, at least one signal in the first signal cluster is transmitted in a continuous time division manner or in a distributed time division manner.

In some possible implementations, a time domain start location of the first resource is before a time domain start location of the first paging occasion; or a time domain start location of the first resource is the same as a time domain start location of the first paging occasion.

Herein, when the time domain start location of the first resource is consistent with the time domain start location corresponding to the first paging occasion, if there is valid paging scheduling information and/or a system message change, the network device sends the paging scheduling information on the first paging occasion. If there is no valid paging scheduling information and/or no system message change, the network device sends the first signal on the first paging occasion. For example, the first signal indicates, to the terminal device, that there is or there is no paging scheduling information on the first paging occasion. Correspondingly, after waking up from the idle mode and before listening on a downlink control channel on the first paging occasion, the terminal device may first attempt to detect a first signal. If a first signal is successfully detected, and the first signal indicates, to the terminal device, that there is no paging scheduling information on the first paging occasion, the terminal device may continue to sleep and enter the idle mode. Alternatively, if the first signal indicates that there is paging scheduling information on the first paging occasion, the terminal device may continue to listen on search space to receive the paging scheduling information.

In some possible implementations, a frequency domain resource of the first resource is the same as a frequency domain resource corresponding to the first paging occasion; or there is a spacing between a frequency domain resource of the first resource and a frequency domain resource corresponding to the first paging occasion.

In some possible implementations, the method further includes:

sending, by the network device, at least one element of the paging configuration parameter and/or at least one element of the first parameter set to the terminal device by using higher layer signaling.

Optionally, the higher layer signaling may be a system message or other higher layer signaling. For example, the higher layer signaling may be radio resource control (RRC) signaling. The system message may be a system information block (SIB) or a master information block (MIB).

According to a second aspect, a signal transmission method is provided, including:

determining, by a terminal device, a first resource based on at least one of a paging configuration parameter, a first parameter set, a terminal device identifier, or a terminal device identification code;

receiving, by the terminal device on the first resource, a first signal sent by a network device, where the first signal is used to indicate, to the terminal device, that there is or there is no paging scheduling information on a first paging occasion; and determining, by the terminal device based on the first signal, whether to listen on a downlink control channel on the first paging occasion.

In this embodiment of this application, the terminal device determines the first resource based on the at least one of the paging configuration parameter, the first parameter set, the terminal device identifier, or the terminal device identification code; receives, on the first resource, the first signal sent by the network device, where the first signal is used to indicate, to the terminal device, that there is or there is no paging scheduling information on the first paging occasion; and determines, based on the first signal, whether to listen on the downlink control channel, reducing power consumption of the terminal device.

Optionally, the paging configuration parameter includes at least one of a paging frame number, a paging period, a paging density, a paging frame quantity, or a quantity of paging occasions in a paging frame.

In some possible implementations, the first parameter set includes at least one of a period indication parameter of a first signal cluster, a start transmission location indication parameter of the first signal cluster, a quantity indication parameter, or a frequency domain resource location indication parameter of the first signal cluster, and the first signal cluster includes at least one signal.

Optionally, the period indication parameter of the first signal cluster is used to indicate a period of the first signal cluster.

The period indication parameter includes an explicit period indication parameter and/or an implicit period indication parameter, the explicit period indication parameter indicates an index number of a period value of the first signal cluster, and the implicit period indication parameter indicates at least one of a quantity of first signal clusters in one paging period or a ratio of a quantity of first signal clusters in one paging period to a quantity of paging occasions.

Optionally, the start transmission location indication parameter of the first signal cluster is used to indicate a start transmission location of the first signal cluster in time domain.

The start transmission location indication parameter indicates a relative location of the start transmission location of the first signal cluster to a second paging occasion, and the second paging occasion is the $1^{st}$ paging occasion of at least one paging occasion corresponding to the first signal cluster.

Optionally, the quantity indication parameter is used to indicate at least one of a quantity of first signals in a paging period, a quantity of first signal clusters in a paging period, or a quantity of first signals in a first signal cluster.

The quantity parameter indicates at least one of: an index number of the quantity of first signals in the paging period, an index number of the quantity of first signal clusters in the paging period, an index number of the quantity of first signals in the first signal cluster, a ratio of a quantity of paging occasions in the paging period to the quantity of first signals, a ratio of a quantity of paging occasions in the paging period to the quantity of first signal clusters, or a ratio of a quantity of paging occasions in a period of the first signal cluster to the quantity of first signals.

Optionally, the frequency domain resource location indication parameter of the first signal is used to indicate a frequency domain resource location of the first signal.

The frequency domain resource location indication parameter includes an explicit frequency domain resource location indication parameter and/or an implicit frequency domain resource location indication parameter, the explicit frequency domain resource location indication parameter indicates an index number of the frequency domain resource location, and the implicit frequency domain resource location indication parameter indicates a relative location of the frequency domain resource location of the first signal to a frequency domain resource location of the first paging occasion.

Optionally, each first signal in the first signal cluster may include a corresponding number or index. The first resource may correspond to a number of the first signal in the first signal cluster. After obtaining the number or the index of the first signal, the terminal device may learn of a corresponding resource location.

In some possible implementations, in one paging period, a quantity of first signals may be the same as or different from a quantity of POs.

Optionally, the terminal device may determine a PO by using the paging configuration parameter, and determine, by using the period indication parameter of the first signal cluster and the start transmission location indication parameter of the first signal cluster, a location of the $1^{st}$ first signal cluster that is before the PO. Optionally, the terminal device may determine, by using a first calculation rule, a corresponding number of a first signal in the $1^{st}$ first signal cluster that is before the PO, to determine the first resource.

Optionally, the corresponding number of the first signal may be determined by using a function of at least one of the paging configuration parameter or the quantity indication parameter. Optionally, the paging configuration parameter includes $PF_{SFN}$, T, nB, N, and Ns, and the quantity indication parameter includes $N_{wus}$, n, or the like. The terminal device may determine $PF_{SFN}$ by using T, N, and nB in the paging configuration parameter, and further determine the corresponding number of the first signal by using a function of at least one of $PF_{SFN}$, T, nB, $N_{wus}$, or n. $PF_{SFN}$ represents a system frame number corresponding to the PO, and is also referred to as a paging frame number. T represents a paging period of the terminal device, nB represents a paging density, $N_{wus}$ represents a quantity of first signals in the first signal cluster, and n represents that a quantity of POs in a period of the first signal cluster is n times of the quantity of first signals in the first signal cluster. In this way, the terminal device can determine the corresponding number of the first signal by calculating the function of $PF_{SFN}$, T, nB, $N_{wus}$, and n, to obtain the first resource corresponding to the corresponding number.

For example, in one paging period, a quantity of first signals may be less than a quantity of POs; in this case, one first signal corresponds to a plurality of POs. Optionally, the number of the first signal in the first signal cluster and the PO may meet the following formula:

$$w_{index} = \left\lfloor \left( \frac{(PF_{SFN} \bmod T)}{T/nB} \bmod(n \cdot N_{wus}) \right) / n \right\rfloor.$$

$W_{index}$ represents the number of the first signal in the first signal cluster, $\lfloor \ \rfloor$ represents a round-down operation, $PF_{SFN}$ represents a system frame number, to be specific, a system frame number corresponding to the first paging occasion, T represents a paging period of the terminal device, nB represents a paging density, $N_{wus}$ represents the quantity of first signals in the first signal cluster, n represents that a quantity of POs in a period of the first signal cluster is n times of the quantity of signals in the first signal cluster, and $$\frac{(PF_{SFN} \bmod T)}{T/nB} \bmod(n \cdot N_{wus})$$

represents a number of a PO in at least one PO corresponding to the first signal cluster. In this way, the terminal device can determine the number of the first signal based on the forgoing formula, to obtain the first resource.

Alternatively, optionally, the number of the first signal in the first signal cluster and the PO may meet the following formula:

$$w_{index} = \left\lfloor \left( \frac{(PF_{SFN} \bmod T)}{T/nB} \bmod(n \cdot N_{wus}) \right) \bmod N_{wus} \right\rfloor.$$

It should be understood that meanings of parameters in the formula are similar to those in the foregoing formula. For brevity, details are not described again. In this way, the terminal device can determine the number of the first signal based on the forgoing formula, to obtain the first resource.

In some possible implementations, the first resource is determined based on the paging configuration parameter, the first parameter set, and the terminal device identifier.

Herein, in one paging period, when a quantity of first signals may be greater than a quantity of POs, one PO corresponds to a plurality of first signals. In this case, the terminal device may determine, based on the paging configuration parameter, the first parameter set, and the terminal device identifier UEID, the first resource for sending the first signal. The terminal device may determine the PO by using the paging configuration parameter, and determine, by using the period indication parameter of the first signal cluster and the start transmission location indication parameter of the first signal cluster, a location of the $1^{st}$ first signal cluster that is before the PO. Optionally, the terminal device may determine, by using a second calculation rule, a corresponding number of a first signal in the $1^{st}$ first signal cluster that is before the PO, to determine the first resource.

Optionally, the corresponding number of the first signal may be determined by using a function of at least one of the paging configuration parameter, the quantity indication parameter, or the terminal device identifier. Optionally, the paging configuration parameter includes $PF_{SFN}$, T, nB, N, and Ns, the quantity indication parameter includes $N_{wus}$, n, and the like, $PF_{SFN}$ may be determined based on T, N, and nB in the paging configuration parameter, and the corresponding number is further determined by using a function of at least one of $PF_{SFN}$, T, nB, $N_{wus}$, n, or UEID. $PF_{SFN}$ represents a system frame number corresponding to the PO, and is also referred to as a paging frame number, T represents a paging period of the terminal device, nB represents a paging density, $N_{wus}$ represents a quantity of first signals in the first signal cluster, n represents that a quantity of POs in a period of the first signal cluster is n times of the quantity of first signals in the first signal cluster, and UEID represents the terminal device identifier. In this way, the terminal device can determine the corresponding number of the first signal by calculating the function of $PF_{SFN}$, T, nB, $N_{wus}$, n, and UEID, to obtain the first resource corresponding to the corresponding number.

Optionally, the number of the first signal in the first signal cluster and re terminal device identifier UEID may meet the following formula:

$$w_{index}^{0} = \frac{(PF_{SFN} \bmod T)}{T/nB} \bmod(N_{wus}/n)$$

$$w_{index}^{1} = \lfloor UEID/N \rfloor \bmod n$$

$$w_{index} = n \cdot w_{index}^{0} + w_{index}^{1}.$$

$W_{index}$ represents the number of the first signal in the first signal cluster, $PF_{SFN}$ represents a system frame number corresponding to the first paging occasion, T represents a paging period of the terminal device, nB represents a paging density, $N_{wus}$ represents the quantity of first signals in the first signal cluster, n represents that a quantity of POs in a period of the first signal cluster is n times of the quantity of first signals in the first signal cluster, $w_{index}^0$ represents a number of the first paging occasion in at least one paging occasion, $w_{index}^1$ represents a number, in n first signals corresponding to one first paging occasion, of a first signal corresponding to a UEID, UEID represents the terminal device identifier, and a value of N is min(T, nB).

In some possible implementations, the first resource is determined based on the paging configuration parameter, the first parameter set, and the terminal device identification code. In this case, the terminal device may determine, based on the paging configuration parameter, the first parameter set, and the terminal device identification code IMSI, the first resource for sending the first signal. The terminal device may determine a PO by using the paging configuration parameter, and determine, by using the period indication parameter of the first signal cluster and the start transmission location indication parameter of the first signal cluster, a location of the $1^{st}$ first signal cluster that is before the PO. Optionally, the terminal device may determine, by using a third calculation rule, a corresponding number of a first signal in the $1^{st}$ first signal cluster that is before the PO, to determine the first resource.

Optionally, the corresponding number of the first signal may be determined by using a function of at least one of the paging configuration parameter, the quantity indication parameter, or the terminal device identification code.

Herein, when a quantity of first signals may be greater than a quantity of POs, one PO corresponds to a plurality of first signals. Further, one terminal device identifier UEID corresponds to a plurality of terminal device identification codes IMSI. In this case, the terminal device may determine, based on the terminal device identification code IMSI, the first resource for sending the first signal.

Optionally, the paging configuration parameter includes $PF_{SFN}$, T, nB, N, and Ns, the quantity indication parameter includes $N_{wus}$, n, and the like, $PF_{SFN}$ may be determined based on T, N, and nB in the paging configuration parameter, and the corresponding number of the first signal is further determined by using a function of at least one of $PF_{SFN}$, T, nB, $N_{wus}$, n, or IMSI. $PF_{SFN}$ represents a system frame number corresponding to the PO, and is also referred to as a paging frame number, T represents a paging period of the terminal device, nB represents a paging density, $N_{wus}$ represents a quantity of first signals in the first signal cluster, n represents that a quantity of POs in a period of the first signal cluster is n times of the quantity of first signals in the first signal cluster, and IMSI represents the terminal device identification code. In this way, the terminal device can determine the corresponding number of the first signal by calculating the function of $PF_{SFN}$, T, nB, $N_{wus}$, n, and IMSI, to obtain the first resource corresponding to the corresponding number.

Optionally, the number of the first signal in the first signal cluster and the terminal device identifier IMSI may meet the following formula:

$$w_{index}^0 = \frac{(PF_{SFN} \bmod T)}{T/nB} \bmod(N_{wus}/n)$$

-continued $$w_{index}^1 = \lfloor IMSI \bmod M / C \rfloor \bmod n$$

$$w_{index} = n \cdot w_{index}^0 + w_{index}^1.$$

$w_{index}^0$ represents a number of the first paging occasion in at least one paging occasion, $w_{index}^1$ represents a number, in n first signals corresponding to one first paging occasion, of a first signal corresponding to a UEID, $PF_{SFN}$ represents a system frame number corresponding to the first paging occasion, T represents a paging period of the terminal device, nB represents a paging density, $N_{wus}$ represents a quantity of signals in the first signal cluster, n represents that a quantity of first paging occasions in a period of the first signal cluster is n times of the quantity of signals in the first signal cluster, IMSI represents the terminal device identification code corresponding to the terminal device, and $W_{index}$ represents the number of the first signal in the first signal cluster. A value of M is a positive integer, and a value range of M may be large enough. When the value of M is large enough, IMSI mod M is approximately equal to IMSI. A value of C is a positive integer, is preferably an integer multiple of 2, and may be 1024, 4096, or another possible value. This is not limited.

In some possible implementations, at least one signal in the first signal cluster is transmitted in a continuous time division manner or in a distributed time division manner.

In some possible implementations, a time domain start location of the first resource is before a time domain start location of the first paging occasion; or a time domain start location of the first resource is the same as a time domain start location of the first paging occasion.

Herein, when the time domain start location of the first resource is consistent with the time domain start location corresponding to the first paging occasion, if there is valid paging scheduling information and/or a system message change, the network device sends the paging scheduling information on the first paging occasion. If there is no valid paging scheduling information and/or no system message change, the network device sends the first signal on the first paging occasion. For example, the first signal indicates, to the terminal device, that there is or there is no paging scheduling information on the first paging occasion. Correspondingly, after waking up from the idle mode and before listening on a downlink control channel on the first paging occasion, the terminal device may first attempt to detect a first signal. If a first signal is successfully detected, and the first signal indicates, to the terminal device, that there is no paging scheduling information on the first paging occasion, the terminal device may continue to sleep and enter the idle mode. Alternatively, if the first signal indicates that there is paging scheduling information on the first paging occasion, the terminal device may continue to listen on search space to receive the paging scheduling information.

In some possible implementations, a frequency domain resource of the first resource is the same as a frequency domain resource corresponding to the first paging occasion; or there is a spacing between a frequency domain resource of the first resource and a frequency domain resource corresponding to the first paging occasion.

In some possible implementations, the method further includes:

receiving, by the terminal device, the paging configuration parameter and/or the first parameter set sent by the network device by using higher layer signaling.

Optionally, the higher layer signaling may be a system message or other higher layer signaling. For example, the higher layer signaling may be radio resource control RRC signaling. The system message may be a system information block SIB or a master information block MIB.

According to a third aspect, a network device is provided, and is configured to perform the method in any one of the first aspect or the possible implementations of the first aspect. Specifically, the network device includes modules configured to perform the method in any one of the first aspect or the possible implementations of the first aspect.

According to a fourth aspect, a terminal device is provided, and is configured to perform the method in any one of the second aspect or the possible implementations of the second aspect. Specifically, the terminal device includes modules configured to perform the method in any one of the second aspect or the possible implementations of the second aspect.

According to a fifth aspect, a network device is provided. The network device includes a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the execution enables the processor to perform the method in any one of the first aspect or the possible implementations of the first aspect.

According to a sixth aspect, a terminal device is provided. The terminal device includes a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the execution enables the processor to perform the method in any one of the second aspect or the possible implementations of the second aspect.

According to a seventh aspect, a computer-readable storage medium is provided. The computer-readable storage medium stores a program. The program enables a network device to perform the signal transmission method in any one of the first aspect or the implementations of the first aspect.

According to an eighth aspect, a computer-readable storage medium is provided. The computer-readable storage medium stores a program. The program enables a terminal device to perform the signal transmission method in any one of the second aspect or the implementations of the second aspect.

BRIEF DESCRIPTION OF DRAWINGS

FIG. 1 is a schematic diagram of an application scenario;
FIG. 2 is a schematic flowchart of a signal transmission method according to an embodiment of this application.

DESCRIPTION OF EMBODIMENTS

Figure 3:
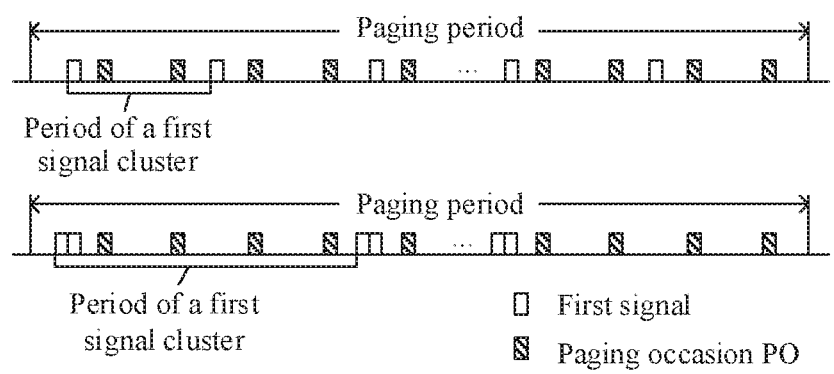
FIG. 3 is a schematic diagram of an example according to an embodiment of this application.

The following describes technical solutions of this application with reference to the accompanying drawings.

It should be understood that the technical solutions in the embodiments of this application may be applied to various existing communications systems or internet of things (IoT) systems, for example, a global system for mobile communications (GSM) system, a code division multiple access (CDMA) system, a wideband code division multiple access (WCDMA) system, a general packet radio service (GPRS), a long term evolution (LTE) system, an LIE frequency division duplex (FDD) system, an LTE time division duplex (TDD) system, a universal mobile telecommunications system (UMTS), and a narrowband internet of things (NB-IoT) system; and in particular, to a future 5G new radio system (NR) system, a 5G system, or a communications system based on an orthogonal frequency division multiplexing (OFDM) technology.

It should further be understood that, in the embodiments of this application, a network device may be referred to as a network device side, a base station, or the like. The base station may be a base transceiver station (BTS) in GSM or CDMA, may be a NodeB in WCDMA, or may be an evolved NodeB (Evolved Node B, eNB, or eNodeB) in LTE, or a base station device gNB in a future 5G network. This is not limited in this application.

It should further be understood that, in the embodiments of this application, a terminal device may communicate with one or more core networks by using a radio access network (RAN), and the terminal device may be referred to as an access terminal device, user equipment (UE), a subscriber unit, a subscriber station, a mobile station, a mobile console, a remote station, a remote terminal, a mobile device, a user terminal, a terminal, a wireless communications device, a user agent, or a user apparatus. The terminal device may be a cellular phone, a cordless phone, a session initiation protocol (SIP) phone, a wireless local loop (WLL) station, a personal digital assistant (PDA), a handheld device with a wireless communication function, a device providing voice and/or data connectivity for a user, a handheld device with a wireless connection function, a computing device or another processing device connected to a wireless modem, a vehicle-mounted device, a wearable device, a terminal device in a future 5G network, or the like.

FIG. 1 is a schematic diagram of a scenario. It should be understood that, for ease of understanding, the scenario in FIG. 1 is introduced herein as an example for description, but does not constitute a limitation on this application. FIG. 1 shows a terminal device 11, a terminal device 12, a terminal device 13, and a base station 21.

As shown in FIG. 1, the terminal device 11 may communicate with the base station 21, the terminal device 12 may communicate with the base station 21, and the terminal device 13 communicates with the base station 21. Alternatively, the terminal device 12 may communicate with the terminal device 11. Alternatively, in another case, the terminal device 13 communicates with the terminal device 12.

FIG. 2 is a schematic flowchart of a signal transmission method 200 according to an embodiment of this application. The method 200 may be performed by a network device. For example, the network device may be the base station 21 in FIG. 1. Correspondingly, a terminal device that communicates with the network device may be the terminal device 11, the terminal device 12, or the terminal device 13 in FIG. 1. As shown in FIG. 2, the method 200 includes the following steps.

S210: The network device generates a first signal, where the first signal is used to indicate, to the terminal device, that there is or there is no paging scheduling information on a first paging occasion.

Optionally, the first signal may be a preset sequence, and the sequence may be a common pseudo-random sequence, a Gold sequence, a Hadamard sequence, a Zadoff-Chu sequence, or the like. Alternatively, the first signal may be a sequence obtained by transforming the foregoing sequence. For example, the first signal is a product sequence of a plurality of sequences, or the first signal may be a sequence obtained after cyclic shift extension or puncturing, or the first signal is a sequence obtained after at least two of the foregoing operations or another transformation operation. This is not limited herein.

Optionally, the first signal may include an enemy detection signal.

Optionally, the first signal may include a data packet. The first signal is a transport block obtained by performing operations such as encoding and modulation on an original information bit. For example, a type indication of the first signal may be represented by using the original information bit. For example, the original information bit may be "0", "1", "00", "01", "10", or "11".

Optionally, the first signal may be used to indicate a paging status of one or more terminal devices on the first paging occasion.

Optionally, the first signal may be used to indicate a paging status of a terminal device on one or more paging occasions. This is not limited.

Optionally, transmission duration of the first signal may be agreed on in advance in a protocol, in other words, both the network device and the terminal device can learn of the transmission duration of the first signal. Alternatively, transmission duration of the first signal may be indicated by the network device. For example, the network device may indicate the transmission duration of the first signal to the terminal device by using a system message or other higher layer signaling. Alternatively, transmission duration of the first signal may be determined according to both a rule agreed on in a protocol and an indication of the network device.

Optionally, the network device may generate a first signal cluster. The first signal cluster includes at least one first signal.

Optionally, at least one signal in the first signal cluster is transmitted in a continuous time division manner or in a distributed time division manner, in other words, there is a time sequence relationship between the at least one signal in the first signal cluster, and the at least one signal may be based on continuous time division or distributed time division. This is not limited in this embodiment of this application. The "continuous time division" means that there are a plurality of first signals that are continuous in a time sequence. In this case, the plurality of first signals occupy a plurality of continuous first resources. The "distributed time division" means that there is at least one first signal distributed in a time sequence. In this case, the at least one first signal occupies a plurality of distributed first resources. For example, the first signal cluster may be divided into a first portion and a second portion, and the first portion or the second portion may include at least one first signal. The first portion and the second portion of the first signal cluster are discontinuous. Optionally, there may be or may not be a paging occasion between the first portion and the second portion of the first signal cluster. This is not limited.

Optionally, a resource occupied by the first signal in the first signal cluster may be based on time division, and different first signals occupy different time domain resources, in other words, the different first signals are sent at different time domain locations. Alternatively, for example, a resource occupied by the first signal may be based on frequency division, and different first signals occupy different frequency domain resources, in other words, the different first signals are sent in different frequency domains locations. Alternatively, for another example, a resource occupied by the first signal may be based on code division, and different first signals are distinguished between each other in different coding schemes. Alternatively, for still another example, a resource occupied by the first signal may be based on space division, and different first signals are distinguished between each other by sending the different first signals on different antenna ports.

Optionally, the first paging occasion may be understood as a paging occasion (PO), or a future concept or term whose granularity is finer than that of a PO. This is not limited in this embodiment of this application. A terminal device in an idle mode usually wakes up on a corresponding PO to listen on a downlink control channel, for example, a physical downlink control channel (PDCCH) or another future channel term.

S220: The network device determines a first resource based on at least one of a paging configuration parameter, a first parameter set, a terminal device identifier, or a terminal device identification code.

It should be understood that, in the embodiments of this application, sequence numbers of the foregoing processes do not indicate an execution sequence. The execution sequence of the processes should be determined based on functions and internal logic of the processes, and should not constitute any limitation on implementation processes of the embodiments of this application.

In other words, in this embodiment of this application, an operation sequence of S210 and S220 is not limited. The network device may first determine the first resource based on the at least one of the paging configuration parameter, the first parameter set, the terminal device identifier, or the terminal device identification code, and then generate the first signal. Alternatively, the network device may first generate the first signal, and then determine the first resource based on the at least one of the paging configuration parameter, the first parameter set, the terminal device identifier, or the terminal device identification code.

S230: The network device sends the first signal to the terminal device on the first resource.

Specifically, the network device may generate the first signal. The first signal is used to indicate, to the terminal device, that there is or there is no paging scheduling information on the first paging occasion, and determines the first resource based on the at least one of the paging configuration parameter, the first parameter set, the terminal device identifier, or the terminal device identification code. The network device sends the first signal to the terminal device on the first resource. Correspondingly, the terminal device determines, based on the first signal, whether the terminal device needs to listen on a downlink control channel. For example, if the first signal indicates, to the terminal device, that there is or there is no paging scheduling information on the first paging occasion, the terminal device remains in the idle mode, in other words, the terminal device does not listen on a downlink control channel on the first paging occasion. For example, if the first signal indicates, to the terminal device, that there is paging scheduling information on the first paging occasion, the terminal device listens on a downlink control channel on the first paging occasion. However, in the prior art, the terminal device always blindly detects PDCCH search space on a corresponding PO in each discontinuous reception (DRX) period, to receive the paging scheduling information, and a power consumption waste is caused. If the method in this embodiment of this application is used, the terminal device can avoid unnecessary listening on the downlink control channel, reducing power consumption of the terminal device.

In addition, in the NB-IoT, in a DRX period, a quantity of terminal devices that share a same PO is relatively large. For example, if there is at least one PO in the DRX period, and there are 4096 terminal device identifiers (User Equipment Identity, UEID) in the DRX period, terminal devices corresponding to a plurality of share one PO. When there is paging scheduling information on the PO, the paging scheduling information may be specific only to some terminal devices corresponding to the PO, and other terminal devices actually do not need to listen on the downlink control channel. In this case, compared with a prior-art manner in which "all terminal devices that share a same PO need to listen on a downlink control channel", in this embodiment of this application, the technical solution functions prominently, so that power consumption of the terminal device can be reduced greatly.

In this embodiment of this application, the network device determines the first resource based on the at least one of the paging configuration parameter, the first parameter set, the terminal device identifier, or the terminal device identification code. In the prior art, the network device may configure a paging configuration parameter by using an existing system message and/or other higher layer signaling, and determine a first paging occasion by using the paging configuration parameter. In this embodiment of this application, the network device may directly use a system message and/or other higher layer signaling in the prior art that are/is used to configure a paging configuration parameter, to save a signaling resource such as a system message and/or other higher layer signaling. Further, the network device in this embodiment of this application may determine the first paging occasion based on the paging configuration parameter in the prior art, and then determines the first resource based on at least one of the paging occasion PO, the terminal device identifier, or the terminal device identification code, reducing external overheads.

In this embodiment of this application, the network device sends the first signal to the terminal device on the first resource. The first signal is used to indicate, to the terminal device, that there is or there is no paging scheduling information on the first paging occasion, so that the terminal device determines, based on the first signal, whether to listen on the downlink control channel, reducing power consumption of the terminal device.

Optionally, the paging configuration parameter may include another possible parameter such as a paging frame number, a paging period, a paging density, a paging frame quantity, or a quantity of paging occasions in a paging frame.

Specifically, the network device or the terminal device may calculate paging system frame (Paging Frame, PF) and a PO location based on the paging configuration parameter. The PF represents a system frame in which the paging scheduling information is located, and a PO represents a subframe in which the paging scheduling information is located. One PF may include at least one PO. For example, after obtaining the paging configuration parameter, the network device or the terminal device may calculate the PF based on Formula (1), and calculate the PO location based on Formula (2):

$$\text{SFN mod } T = (T \text{ div } N) \times (\text{UEID mod } N) \qquad (1).$$

A system frame number (SFN) that meets Formula (1) may be used as a PF frame. T represents a paging period, the paging period is a DRX period of paging, a value of T is a positive integer, and a value range of T may be a system frame such as {32, 64, 128, 256}; mod represents an modulo operation; nB represents a paging density, to be specific, a quantity of paging occasions in one paging period, a value of nB is a positive integer, and a value range of nB may be {4T, 2T, T, T/2, T/4, T/8, T/16, T/32}; N represents a paging frame quantity and has a value of min(T, nB), that is, a smaller value of T and nB, a value of N is a positive integer, and a value range of N is {T, T/2, T/4, T/8, T/16, T/32}; and a value of UEID is (IMSI mod C), and a value of C may be 1024, 4096, or another possible value. This is not limited herein. One terminal device identifier UEID may correspond to a plurality of terminal identification codes (International Mobile Subscriber Identity, IMSI), that is, the UEID is a group including a plurality of IMSIs. The terminal device identification code IMSI of each terminal device is unique.

$$i\_s = \text{floor}(\text{UEID}/N) \text{mod } Ns \qquad (2).$$

In Formula (2), i_s represents a PO index, and after i_s is calculated, a subframe in which a PO is located may be obtained by looking up a table; floor represents a round-down operation; and Ns=max(1, nB/T) represents a quantity of paging occasions in a paging frame, that is, a quantity of POs in each PF, and a value of Ns is a positive integer. One PO may correspond to a plurality of terminal device identifiers UEIDs, in other words, POs determined by the plurality of UEIDs may be a same PO.

In conclusion, the network device or the terminal device may calculate the PF and the PO location by using Formula (1) and Formula (2).

In this embodiment of this application, the network device may generate one or more first signals, for example, a first signal cluster. The first signal cluster includes at least one first signal.

Optionally, the first signal cluster is periodic. The network device may send the first signal cluster in each period. In addition, there is at least one PO in each period, in other words, one first signal cluster corresponds to at least one PO.

Optionally, the first parameter set includes at least one of a period indication parameter of a first signal cluster, a start transmission location indication parameter of the first signal cluster, a quantity indication parameter, or a frequency domain resource location indication parameter of the first signal cluster, the first signal cluster includes at least one signal, and the first signal is a signal in the first signal cluster.

Specifically, the period indication parameter of the first signal cluster is used to indicate a period of the first signal cluster, and the period indication parameter includes an explicit period indication parameter and/or an implicit period indication parameter. The explicit period indication parameter indicates an index number of a period value of the first signal cluster. The period indication parameter of the first signal cluster may explicitly indicate a period value. In this way, the network device or the terminal device can determine the period value of the first signal cluster based on the index number of the period value of the first signal cluster, to determine a specific interval of radio frames at which one first signal cluster is sent, and to determine a quantity of first signal clusters in one paging period.

Alternatively, the implicit period indication parameter indicates a quantity of first signal clusters in one paging period. In this way, the network device or the terminal device can obtain a quantity of radio frames between every two first signal clusters based on the paging period and the quantity of first signal clusters and by dividing the paging period by the quantity of first signal clusters, to obtain the period of the first signal cluster.

Alternatively, the implicit period indication parameter indicates a ratio of a quantity of first signal clusters in one paging period to a quantity of paging occasions, and a quantity of paging occasions in each paging period may be calculated by using a prior-art method. In this way, the network device or the terminal device can obtain a quantity of first signal clusters based on a ratio of the quantity of first signal clusters to the quantity of paging occasions, and further obtain a quantity of radio frames between every two first signal clusters by dividing the paging period by the quantity of first signal clusters, to determine the period of the first signal cluster.

Specifically, the start transmission location indication parameter of the first signal cluster is used to indicate a start transmission location of the first signal cluster in time domain, and the start transmission location indication parameter indicates a location of the start transmission location of the first signal cluster to a second paging occasion, and the second paging occasion is the $1^{st}$ paging occasion in at least one paging occasion corresponding to the first signal cluster. The second paging occasion may be the same as or different from the first paging occasion.

For example, after determining the period of the first signal cluster, the network device or the terminal device may determine a specific radio frame in which the first signal cluster is to be sent, and may determine at least one paging occasion corresponding to the first signal cluster. In this case, the $1^{st}$ paging occasion of the at least one paging occasion corresponding to the first signal cluster may be determined, in other words, the first paging occasion that appears starting from the specific radio frame may be determined. The network device or the terminal device may deduce, based on the relative location of the start transmission location of the first signal cluster to the second paging occasion, a relative location from the $1^{st}$ paging occasion corresponding to the first signal cluster, and use the obtained location as the start transmission location of the first signal cluster. Alternatively, it may be directly agreed on that the start transmission location of the first signal cluster is a fixed location. For example, after determining the period of the first signal cluster, the network device or the terminal device may determine a specific radio frame in which the first signal cluster is to be sent. In this case, a fixed subframe location is agreed on according to a protocol, and is used as the start transmission location for sending the first signal cluster.

Specifically, the quantity indication parameter is used to indicate at least one of a quantity of first signals in a paging period, a quantity of first signal clusters in a paging period, or a quantity of first signals in a first signal cluster. Optionally, the quantity parameter indicates at least one of: an index number of the quantity of first signals in the paging period, an index number of the quantity of first signal clusters in the paging period, an index number of the quantity of first signals in the first signal cluster, a ratio of a quantity of paging occasions in the paging period to the quantity of first signals, a ratio of a quantity of paging occasions in the paging period to the quantity of first signal clusters, or a ratio of a quantity of paging occasions in a period of the first signal cluster to the quantity of first signals.

Specifically, the frequency domain resource location indication parameter of the first signal is used to indicate a frequency domain resource location of the first signal cluster, and the frequency domain resource location indication parameter includes an explicit frequency domain resource location indication parameter and/or an implicit frequency domain resource location indication parameter. The explicit frequency domain resource location indication parameter indicates an index number of the frequency domain resource location. Optionally, the explicit frequency domain resource location indication parameter may be agreed on in advance in a protocol, in other words, both the network device and the terminal device may learn of the explicit frequency domain resource location indication parameter. In this way, the network device or the terminal device can determine the frequency domain resource location of the first signal cluster based on the index number indicated by the explicit frequency domain resource location indication parameter of the first signal cluster. The implicit frequency domain resource location indication parameter indicates a relative location of the frequency domain resource location of the first signal to the frequency domain resource location of the first paging occasion, and the network device or the terminal device may deduce the relative location from the frequency domain resource location of the $1^{st}$ paging occasion based on the location of the frequency domain resource location of the first signal relative to the frequency domain resource location of the first paging occasion, and use the obtained location as the frequency domain resource location of the first signal. Alternatively, the implicit frequency domain resource location indication parameter may alternatively be determined according to both a rule agreed on in a protocol and an indication of the network device.

Optionally, the network device may send at least one element of the paging configuration parameter and/or at least one element of the first parameter set to the terminal device. Further, the network device may send the at least one element of the paging configuration parameter and/or at least one element of the first parameter set to the terminal device by using higher layer signaling. The higher layer signaling may be a system message or other higher layer signaling. For example, the higher layer signaling may be radio resource control (Radio Resource Control, RRC) signaling. The system message may be a system information block (System Information Block, SIB) or a master information block (Master Information Block, MIB).

In this embodiment of this application, the first resource for sending the first signal may be determined based on the at least one of the paging configuration parameter, the first parameter set, the terminal device identifier, or the terminal device identification code. The following describes some possible combinations by using an example.

For example, optionally, the first resource is determined based on the paging configuration parameter and the first parameter set, in other words, the network device or the terminal device may determine the first resource based on the paging configuration parameter and the first parameter set.

Optionally, in one paging period, a quantity of first signals may be the same as or different from a quantity of POs.

For example, in one paging period, a quantity of first signals may be less than a quantity of POs. In this case, one first signal corresponds to a plurality of POs. In this case, the network device or the terminal device may determine, based on the paging configuration parameter and the first parameter set, the first resource for sending the first signal. The network device or the terminal device may determine a PO by using the paging configuration parameter, and determine a location of the $1^{st}$ first signal cluster before the PO by using the period indication parameter of the first signal cluster and the start transmission location indication parameter of the first signal cluster. The network device or the terminal device may determine, by using a first calculation rule, a corresponding number of a first signal in the $1^{st}$ first signal cluster that is before the PO, to determine the first resource.

The following describes the first calculation rule. Specifically, there is a correspondence between the first resource and the corresponding number of the first signal in the first signal cluster, the first signal cluster includes at least one first signal, and each first signal corresponds to one first resource. For example, when the corresponding number of the first signal is "0", the first resource is the $1^{st}$ first resource of all first resources corresponding to the first signal cluster.

Optionally, the corresponding number of the first signal may be determined by using a function of at least one of the paging configuration parameter or the quantity indication parameter. Optionally, the paging configuration parameter includes $PF_{SFN}$, T, nB, N, and Ns, and the quantity indication parameter includes $N_{wus}$, n, or the like. The network device or the terminal device may determine $PF_{SFN}$ by using T, N, and nB in the paging configuration parameter, and further determine the corresponding number of the first signal by using a function of at least one of $PF_{SFN}$, T, nB, $N_{wus}$, or n. $PF_{SFN}$ represents a system frame number corresponding to the PO, and is also referred to as a paging frame number, T represents a paging period of the terminal device, nB represents a paging density, $N_{wus}$ represents a quantity of first signals in the first signal cluster, and n represents that a quantity of POs in a period of the first signal cluster is n times of the quantity of first signals in the first signal cluster. In this way, the network device or the terminal device can determine the corresponding number of the first signal by calculating the function of $PF_{SFN}$, T, nB, $N_{wus}$, and n, to obtain the first resource corresponding to the corresponding number.

The following provides specific description with reference to FIG. 3. It should be understood that the example in FIG. 3 is introduced merely for helping a person skilled in the art understand the technical solutions of the embodiments of this application, and constitutes no limitation on the embodiments of this application.

FIG. 3 is a schematic diagram of an example according to an embodiment of this application. A paging period may include a plurality of first signal clusters. The first signal cluster is periodic. As shown by the upper part of FIG. 3, in one paging period, each of a plurality of first signal clusters includes one first signal, and two POs correspond to one first signal, so that the two POs correspond to one first resource. The network device or the terminal device may directly or indirectly obtain, based on the period indication parameter and the start transmission location indication parameter of the first signal cluster, a specific subframe in which the first resource is located in a radio frame. On the lower part of FIG. 3, optionally, a period of one first signal cluster may include four POs. As shown by the lower part of FIG. 3, in one paging period, each of a plurality of first signal clusters includes two first signals, and two POs may correspond to one first signal.

Optionally, each first signal in the first signal cluster may include a corresponding number or index. The first resource may correspond to a number of the first signal in the first signal cluster. After obtaining the number or the index of the first signal, the network device or the terminal device may learn of a corresponding resource location.

For example, on the lower part of FIG. 3, first two POs of the four POs may correspond to the $1^{st}$ first resource (to be specific, a resource used to send the $1^{st}$ signal of the two first signals) of two resources, and last two POs may correspond to the $2^{nd}$ first resource (to be specific, a resource used to send the $2^{nd}$ signal of the two first signals) in two resource locations.

For example, the number of the first signal in the first signal cluster and the PO may meet Formula (3):

$$w_{index} = \left\lfloor \left( \frac{(PF_{SFN} \bmod T)}{T/nB} \bmod(n \cdot N_{wus}) \right) / n \right\rfloor. \qquad (3)$$

$W_{index}$ represents the number of the first signal in the first signal cluster, $\lfloor \ \rfloor$ represents a round-down operation, $PF_{SFN}$ represents a system frame number, to be specific, a system frame number corresponding to the first paging occasion, T represents a paging period of the terminal device, nB represents a paging density, $N_{wus}$ represents the quantity of first signals in the first signal cluster, n represents that a quantity of POs in a period of the first signal cluster is n times of the quantity of signals in the first signal cluster, and $$\frac{(PF_{SFN} \bmod T)}{T/nB} \bmod(n \cdot N_{wus})$$

represents a number of a PO in at least one PO corresponding to the first signal cluster. In this way, the network device or the terminal device can determine the number of the first signal based on the forgoing formula, to obtain the first resource.

A specific example is used for Formula (3). Assuming that T=128, nB=T, N=128, and Ns=1, for a terminal device, $(PF \bmod T) = 114$, and $T/nB = 1$, where $\frac{(PF_{SFN} \bmod T)}{T/nB}$ indicates that in a paging period, a PO corresponding to the terminal device is located in a subframe 0 in the $114^{th}$ PF. Assuming that $N_{wus}=2$, $w_{index}=\{0, 1\}$, and n=2, one first signal cluster corresponds to four POs.

$$\frac{(PF_{SFN} \bmod T)}{T/nB} \bmod(n \cdot N_{wus}) = 2$$

indicates that the terminal device corresponds to the $3^{rd}$ PO of the four POs. Further, $w_{index}=1$ indicates that the terminal device corresponds to the $2^{nd}$ first signal in the first signal cluster, and correspondingly, corresponds to the $2^{nd}$ first resource of the two first resources.

Alternatively, for another example, on the lower part of FIG. 3, the $1^{st}$ PO and the $3^{rd}$ PO of the four POs may correspond to the first resource (to be specific, a resource used to send the $1^{st}$ signal of the two first signals) in the two resource locations, and the $2^{nd}$ PO and the $4^{th}$ PO may correspond to the $2^{nd}$ first resource (to be specific, a resource used to send the $2^{nd}$ signal of the two first signals) in the two resource locations.

For example, the number of the first signal in the first signal cluster and the PO may meet Formula (4):

$$w_{index} = \left\lfloor \left( \frac{(PF_{SFN} \bmod T)}{T/nB} \bmod(n \cdot N_{wus}) \right) \bmod N_{wus} \right\rfloor. \quad (4)$$

It should be understood that, meanings of parameters in Formula (4) are similar to those in Formula (3). For brevity, details are not described again.

A specific example is used for Formula (4). Assuming that T=128, nB=T, N=128, and Ns=1, for a terminal device, $$(PF_{SFN} \bmod T) = 114, \text{ and } T/nB = 1, \text{ where } \frac{(PF_{SFN} \bmod T)}{T/nB}$$

indicates that in a paging period, a PO corresponding to the terminal device is located in a subframe 0 in the $114^{th}$ PF. Assuming that $N_{wus}$=2, $w_{index}$={0, 1}, and n=2, one first signal cluster corresponds to four POs.

$$\frac{(PF_{SFN} \bmod T)}{T/nB} \bmod(n \cdot N_{wus}) = 2$$

indicates that the terminal device corresponds to the $3^{rd}$ PO of the four POs. Further, $w_{index}$=0 indicates that the terminal device corresponds to the $1^{st}$ first signal in the first signal cluster, and correspondingly, corresponds to the $1^{st}$ first resource of the two first resources.

In conclusion, the network device or the terminal device may calculate a corresponding number or index of the first signal in the first signal cluster based on the PO in combination with Formula (3) or Formula (4), to determine the first resource corresponding to the first signal.

For example, optionally, the first resource is determined based on the paging configuration parameter, the first parameter set, and the terminal device identifier. In other words, the network device or the terminal device may determine, based on the terminal device identifier UEID, the first resource for sending the first signal.

For example, in one paging period, a quantity of first signals may be greater than a quantity of POs; in this case, one PO corresponds to a plurality of first signals. In this case, the network device or the terminal device may determine, based on the paging configuration parameter, the first parameter set, and the terminal device identifier UEID, the first resource for sending the first signal. The network device or the terminal device may determine the PO by using the paging configuration parameter, and determine, by using the period indication parameter of the first signal cluster and the start transmission location indication parameter of the first signal cluster, a location of the $1^{st}$ first signal cluster that is before the PO. Optionally, the network device or the terminal device may determine, by using a second calculation rule, a corresponding number of a first signal in the $1^{st}$ first signal cluster that is before the PO, to determine the first resource.

The following describes the second calculation rule. Specifically, there is a correspondence between the first resource and the corresponding number of the first signal in the first signal cluster, the first signal cluster includes at least one first signal, and each first signal corresponds to one first resource. For example, when the corresponding number of the first signal is "0", the first resource is the $1^{st}$ first resource of all first resources corresponding to the first signal cluster.

Optionally, the corresponding number of the first signal may be determined by using a function of at least one of the paging configuration parameter, the quantity indication parameter, or the terminal device identifier. Optionally, the paging configuration parameter includes $PF_{SFN}$, T, nB, N, and Ns, the quantity indication parameter includes $N_{wus}$, n, and the like, $PF_{SFN}$ may be determined based on T, N, and nB in the paging configuration parameter, and the corresponding number is further determined by using a function of at least one of $PF_{SFN}$, T, nB, $N_{wus}$, n, or UEID. $PF_{SFN}$ represents a system frame number corresponding to the PO, and is also referred to as a paging frame number, T represents a paging period of the terminal device, nB represents a paging density, $N_{wus}$ represents a quantity of first signals in the first signal cluster, n represents that a quantity of POs in a period of the first signal cluster is n times of the quantity of first signals in the first signal cluster, and UEID represents the terminal device identifier. In this way, the network device or the terminal device can determine the corresponding number of the first signal by calculating the function of $PF_{SFN}$, T, nB, $N_{wus}$, n, and UEID, to obtain the first resource corresponding to the corresponding number.

Figure 4:
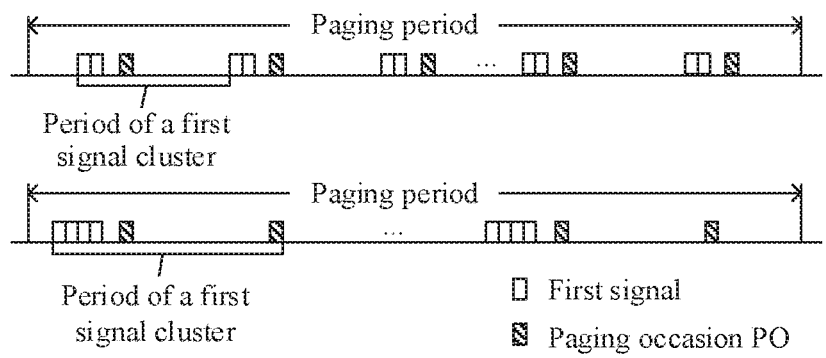
FIG. 4 is a schematic diagram of another example according to an embodiment of this application.

The following provides specific description with reference to FIG. 4. It should be understood that the example in FIG. 4 is introduced merely for helping a person skilled in the art understand the technical solutions of the embodiments of this application, and constitutes no limitation on the embodiments of this application.

FIG. 4 is a schematic diagram of an example according to an embodiment of this application. A paging period may include a plurality of first signal clusters. The first signal cluster is periodic. On the upper part of FIG. 4, optionally, a period of one first signal cluster may include one PO, one PO corresponds to a plurality of UEIDs, and each UEID corresponds to one first resource. As shown by the upper part of FIG. 4, in one paging period, each of a plurality of first signal clusters includes two first signals, and one PO corresponds to two first signals, so that one PO corresponds to two first resources. The network device or the terminal device may determine the first resource based on the UEID. On the lower part of FIG. 4, optionally, a period of one first signal cluster may include two POs. In this case, one PO may correspond to a plurality of first resources, one PO corresponds to a plurality of UEIDs, and each UEID corresponds to one first resource. As shown by the lower part of FIG. 4, in one paging period, each of a plurality of first signal clusters includes four first signals, and one of the two POs corresponds to a plurality of first signals.

For example, the number of the first signal in the first signal cluster and the terminal device identifier UEID may meet Formula (5):

$$w_{index}^0 = \frac{(PF_{SFN} \bmod T)}{T/nB} \bmod(N_{wus}/n) \quad (5)$$

-continued $$w_{index}^1 = \lfloor UEID/N \rfloor \bmod n$$

$$w_{index} = n \cdot w_{index}^0 + w_{index}^1.$$

$W_{index}$ represents the number of the first signal in the first signal cluster, $PF_{SFN}$ represents a system frame number corresponding to the first paging occasion, T represents a paging period of the terminal device, nB represents a paging density, $N_{wus}$ represents the quantity of first signals in the first signal cluster, n represents that a quantity of POs in a period of the first signal cluster is n times of the quantity of first signals in the first signal cluster, $w_{index}^0$ represents a number of the first paging occasion in at least one first paging occasion, $w_{index}^1$ represents a number, in n first signals corresponding to one first paging occasion, of a first signal corresponding to a UEID, UEID represents the terminal device identifier, and a value of N is min(T, nB).

A specific example is used for Formula (5). Assuming that T=128, nB=T, N=128, and Ns=1, for a terminal device, $$(PF_{SFN} \bmod T) = 114, \text{ and } T/nB = 1,$$

$$\text{where } \frac{(PF_{SFN} \bmod T)}{T/nB}$$

indicates that in a paging period, a PO corresponding to the terminal device is located in a subframe 0 in the $114^{th}$ PF. Assuming that $N_{wus}$=4, $w_{index}$={0, 1, 2, 3}, and n=2, one first signal cluster corresponds to two POs.

$$\frac{(PF_{SFN} \bmod T)}{T/nB} \bmod(n \cdot N_{wus}) = 0$$

indicates that the terminal device corresponds to the $1^{st}$ PO of the two POs. Further, $w_{index}$=1 indicates that the terminal device corresponds to the $2^{nd}$ first signal in the first signal cluster, and correspondingly, corresponds to the $2^{nd}$ first resource of the four first resources.

In conclusion, the network device or the terminal device may calculate a number or an index of the first signal in the first signal cluster based on UEID in combination with Formula (5), to determine the first resource corresponding to the first signal.

For example, optionally, the first resource is determined based on the paging configuration parameter, the first parameter set, and the terminal device identification code. In other words, the network device or the terminal device may determine the first resource based on the paging configuration parameter, the first parameter set, and the terminal device identification code IMSI.

For example, in one paging period, a quantity of first signals may be greater than a quantity of POs; in this case, one PO corresponds to a plurality of first signals. In this case, the network device or the terminal device may determine, based on the paging configuration parameter, the first parameter set, and the terminal device identification code IMSI, the first resource for sending the first signal. The network device or the terminal device may determine the PO by using the paging configuration parameter, and determine, by using the period indication parameter of the first signal cluster and the start transmission location indication parameter of the first signal cluster, a location of the $1^{st}$ first signal cluster that is before the PO. Optionally, the network device or the terminal device may determine, by using a third calculation rule, a corresponding number of a first signal in the $1^{st}$ first signal cluster that is before the PO, to determine the first resource.

The following describes the third calculation rule. Specifically, there is a correspondence between the first resource and the corresponding number of the first signal in the first signal cluster, the first signal cluster includes at least one first signal, and each first signal corresponds to one first resource. For example, when the corresponding number of the first signal is "0", the first resource is the $1^{st}$ first resource of all first resources corresponding to the first signal cluster.

Optionally, the corresponding number of the first signal may be determined by using a function of at least one of the paging configuration parameter, the quantity indication parameter, or the terminal device identification code. Optionally, the paging configuration parameter includes $PF_{SFN}$, T, nB, N, and Ns, the quantity indication parameter includes $N_{wus}$, n, and the like, $PF_{SFN}$ may be determined based on T, N, and nB in the paging configuration parameter, and the corresponding number of the first signal is further determined by using a function of at least one of $PF_{SFN}$, T, nB, $N_{wus}$, n, or IMSI. $PF_{SFN}$ represents a system frame number corresponding to the PO, and is also referred to as a paging frame number, T represents a paging period of the terminal device, nB represents a paging density, $N_{wus}$ represents a quantity of first signals in the first signal cluster, n represents that a quantity of POs in a period of the first signal cluster is n times of the quantity of first signals in the first signal cluster, and IMSI represents the terminal device identification code. In this way, the network device or the terminal device can determine the corresponding number of the first signal by calculating the function of $PF_{SFN}$, T, nB $N_{wus}$, n, and IMSI, to obtain the first resource corresponding to the corresponding number. For example, for the case shown in FIG. 4, the number of the first signal in the first signal cluster and the terminal device identifier IMSI may meet Formula (6):

$$w_{index}^0 = \frac{(PF_{SFN} \bmod T)}{T/nB} \bmod(N_{wus}/n) \qquad (6)$$

$$w_{index}^1 = \lfloor IMSI \bmod M / C \rfloor \bmod n$$

$$w_{index} = n \cdot w_{index}^0 + w_{index}^1.$$

$w_{index}^0$ represents a number of the first paging occasion in at least one paging occasion, $w_{index}^1$ represents a number, inn first signals corresponding to one first paging occasion, of a first signal corresponding to a UEID, $PF_{SFN}$ represents a system frame number corresponding to the first paging occasion, T represents a paging period of the terminal device, nB represents a paging density, $N_{wus}$ represents a quantity of signals in the first signal cluster, n represents that a quantity of first paging occasions in a period of the first signal cluster is n times of the quantity of signals in the first signal cluster, IMSI represents the terminal device identification code corresponding to the terminal device, and $W_{index}$ represents the number of the first signal in the first signal cluster. A value of M is a positive integer, and a value range of M may be large enough. When the value of M is large enough, IMSI mod M is approximately equal to IMSI. A value of C is a positive integer, is preferably an integer multiple of 2, and may be 1024, 4096, or another possible value. This is not limited.

In conclusion, the network device or the terminal device may calculate a number or an index of the first signal in the first signal cluster based on IMSI in combination with Formula (6), to determine the first resource corresponding to the first signal.

Optionally, a time domain start location of the first resource is before a time domain location of the first paging occasion; or a time domain start location of the first resource is the same as a time domain location of the first paging occasion. Herein, when the time domain start location of the first resource is consistent with the time domain location corresponding to the first paging occasion, if there is valid paging scheduling information and/or a system message change, the network device sends the paging scheduling information on the first paging occasion. If there is no valid paging scheduling information and/or no system message change, the network device sends the first signal on the first paging occasion. For example, the first signal indicates, to the terminal device, that there is or there is no paging scheduling information on the first paging occasion. Correspondingly, after waking up from the idle mode and before listening on a downlink control channel on the first paging occasion, the terminal device may first attempt to detect a first signal. If a first signal is successfully detected, and the first signal indicates, to the terminal device, that there is no paging scheduling information on the first paging occasion, the terminal device may continue to sleep and enter the idle mode. Alternatively, if the first signal indicates that there is paging scheduling information on the first paging occasion, the terminal device may continue to listen on search space to receive the paging scheduling information.

Optionally, a frequency domain resource of the first resource is the same as a frequency domain resource corresponding to the first paging occasion; or there is a spacing between a frequency domain resource corresponding to the first resource and a frequency domain resource corresponding to the first paging occasion.

In other words, the time domain resource location occupied by the first resource for sending the first signal may be before the time domain resource location of the first paging occasion, or may be the same as the time domain resource location of the first paging occasion. This is not limited in this embodiment of this application. In addition, there may be a spacing between the frequency domain resource location occupied by the first resource for sending the first signal and the frequency domain resource location corresponding to the first paging occasion, or the frequency domain resource location occupied by the first resource for sending the first signal may be the same as the frequency domain resource location corresponding to the first paging occasion. This is not limited in this embodiment of this application.

Optionally, the method 200 further includes the following step:

The network device sends at least one element of the paging configuration parameter and/or at least one element of the first parameter set to the terminal device by using higher layer signaling. Optionally, the higher layer signaling may be a system message or other higher layer signaling. For example, the higher layer signaling may be radio resource control RRC signaling. The system message may be a system information block SIB or a master information block MIB.

Therefore, in this embodiment of this application, the network device sends the first signal to the terminal device, where the first signal is used to indicate, to the terminal device, that there is or there is no paging scheduling information on the first paging occasion; and determines the first resource based on the at least one of the paging configuration parameter, the first parameter set, the terminal device identifier, or the terminal device identification code, so that the network device sends the first signal on the first resource, and the terminal device receives the first signal and determines, based on the first signal, whether to listen on the downlink control channel, reducing power consumption of the terminal device.

Figure 5:
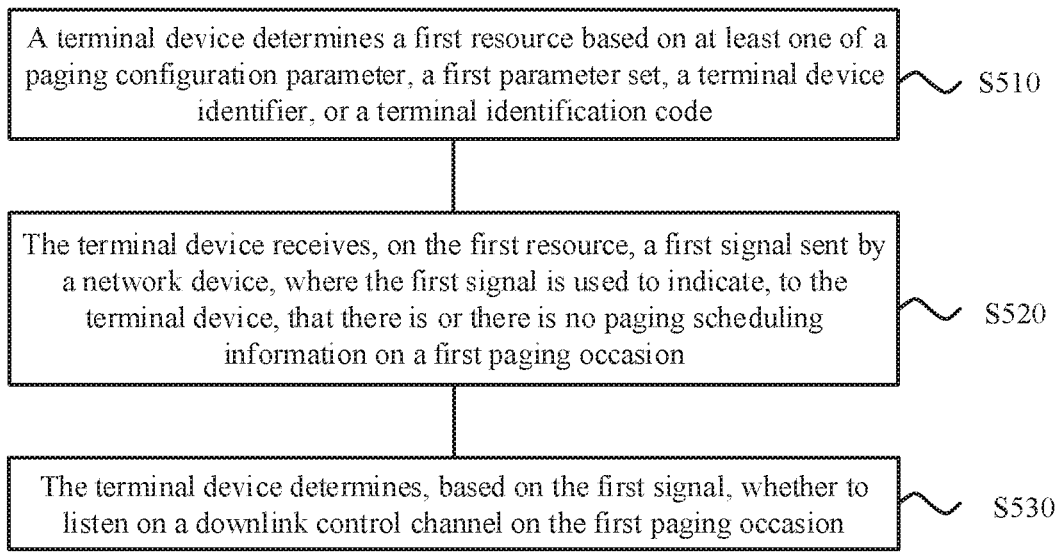
FIG. 5 is a schematic flowchart of a signal transmission method according to another embodiment of this application.

The following describes, on a terminal device side, a signal transmission method according to an embodiment of this application. For brevity, terms or concepts similar to those on a network device side are not described again. FIG. 5 is a schematic flowchart of a signal transmission method 500 according to an embodiment of this application. The method 500 may be performed by a terminal device. For example, the terminal device may be the terminal device 11, the terminal device 12, or the terminal device 13 in FIG. 1. Correspondingly, a network device communicating with the terminal device may be the base station 21 in FIG. 1. As shown in FIG. 5, the method 500 includes the following steps.

S510: The terminal device determines a first resource based on at least one of a paging configuration parameter, a first parameter set, a terminal device identifier, or a terminal device identification code.

S520: The terminal device receives, on the first resource, a first signal sent by the network device, where the first signal is used to indicate, to the terminal device, that there is or there is no paging scheduling information on a first paging occasion.

S530: The terminal device determines, based on the first signal, whether to listen on a downlink control channel on the first paging occasion.

Specifically, the terminal device determines the first resource based on the at least one of the paging configuration parameter, the first parameter set, the terminal device identifier, or the terminal device identification code, then receives, by using the first resource, the first signal sent by the network device, and finally determines, based on the first signal, whether to listen on the downlink control channel. For example, if the first signal indicates, to the terminal device, that there is or there is no paging scheduling information on the first paging occasion, the terminal device remains in an idle mode, in other words, the terminal device does not listen on a downlink control channel on the first paging occasion. For example, if the first signal indicates, to the terminal device, that there is paging scheduling information on the first paging occasion, the terminal device listens on a downlink control channel on the first paging occasion.

In this embodiment of this application, the terminal device receives the first signal sent by the network device, where the first signal is used to indicate, to the terminal device, that there is or there is no paging scheduling information on the first paging occasion; and determines, based on the first signal, whether to listen on the downlink control channel, reducing power consumption of the terminal device.

Optionally, the paging configuration parameter includes at least one of a paging frame number, a paging period, a paging density, a paging frame quantity, or a quantity of paging occasions in a paging frame.

Optionally, the first parameter set includes at least one of a period indication parameter of a first signal cluster, a start transmission location indication parameter of a first signal cluster, a quantity indication parameter, or a frequency domain resource location indication parameter of a first signal, and the first signal cluster includes at least one signal.

Optionally, the period indication parameter of the first signal cluster is used to indicate a period of the first signal cluster.

The period indication parameter includes an explicit period indication parameter and/or an implicit period indication parameter, the explicit period indication parameter indicates an index number of a period value of the first signal cluster, and the implicit period indication parameter indicates at least one of a quantity of first signal clusters in one paging period or a ratio of a quantity of first signal clusters in one paging period to a quantity of paging occasions.

Optionally, the start transmission location indication parameter of the first signal cluster is used to indicate a start transmission location of the first signal cluster in time domain.

The start transmission location indication parameter indicates a corresponding location of the start transmission location of the first signal cluster to a second paging occasion, and the second paging occasion is the $1^{st}$ paging occasion of at least one paging occasion corresponding to the first signal cluster.

Optionally, the quantity indication parameter is used to indicate at least one of a quantity of first signals in a paging period, a quantity of first signal clusters in a paging period, or a quantity of first signals in a first signal cluster.

The quantity parameter indicates at least one of: an index number of the quantity of first signals in the paging period, an index number of the quantity of first signal clusters in the paging period, an index number of the quantity of first signals in the first signal cluster, a ratio of a quantity of paging occasions in the paging period to the quantity of first signals, a ratio of a quantity of paging occasions in the paging period to the quantity of first signal clusters, or a ratio of a quantity of paging occasions in a period of the first signal cluster to the quantity of first signals.

Optionally, the frequency domain resource location indication parameter of the first signal is used to indicate a frequency domain resource location of the first signal.

The frequency domain resource location indication parameter includes an explicit frequency domain resource location indication parameter and/or an implicit frequency domain resource location indication parameter, the explicit frequency domain resource location indication parameter indicates an index number of the frequency domain resource location, and the implicit frequency domain resource location indication parameter indicates a relative location of the frequency domain resource location of the first signal to a frequency domain resource location of the first paging occasion.

Optionally, the first resource is determined based on the paging configuration parameter and the first parameter set.

Optionally, the first resource is determined based on the paging configuration parameter, the first parameter set, and the terminal device identifier.

Optionally, the first resource is determined based on the paging configuration parameter, the first parameter set, and the terminal device identification code.

It should be understood that, for the foregoing method for determining the first resource, refer to the foregoing description, and a method for determining the first resource is similar to that for determining the first resource on the network device side. For brevity, details are not described again.

Optionally, at least one signal in the first signal cluster is transmitted in a continuous time division manner or in a distributed time division manner.

Optionally, a time domain start location of the first resource is before a time domain start location of the first paging occasion; or a time domain start location of the first resource is the same as a time domain start location of the first paging occasion.

Optionally, a frequency domain resource of the first resource is the same as a frequency domain resource corresponding to the first paging occasion; or there is a spacing between a frequency domain resource of the first resource and a frequency domain resource corresponding to the first paging occasion.

Optionally, the method 500 further includes the following step:

The terminal device receives at least one element of the paging configuration parameter and/or at least one element of the first parameter set sent by the network device by using higher layer signaling.

Therefore, the terminal device receives the first signal sent by the network device. Where the first signal is used to indicate, to the terminal device, that there is or there is no paging scheduling information on the first paging occasion; and determines, based on the first signal, whether to listen on the downlink control channel, reducing power consumption of the terminal device.

The foregoing describes the signal transmission method according to the embodiments of this application. The following describes a network device and a terminal device according to the embodiments of this application.

Figure 6:
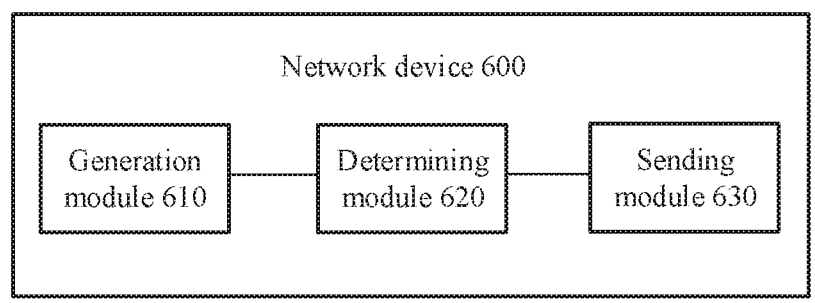
FIG. 6 is a schematic block diagram of a network device according to an embodiment of this application.

FIG. 6 is a schematic block diagram of a network device 600 according to an embodiment of this application. As shown in FIG. 6, the network device 600 includes:

a generation module 610, configured to generate a first signal, where the first signal is used to indicate to a terminal device that there is or there is no paging scheduling information on a first paging occasion;

a determining module 620, configured to determine a first resource based on at least one of a paging configuration parameter, a first parameter set, a terminal device identifier, or a terminal identification code; and a sending module 630, configured to send the first signal to the terminal device on the first resource.

In this embodiment of this application, the network device 600 sends the first signal to the terminal device. The first signal is used to indicate, to the terminal device, that there is or there is no paging scheduling information on the first paging occasion, so that the terminal device determines, based on the first signal, whether to listen on a downlink control channel, reducing power consumption of the terminal device.

Optionally, the paging configuration parameter includes at least one of a paging frame number, a paging period, a paging density, a paging frame quantity, or a quantity of paging occasions in a paging frame.

Optionally, the first parameter set includes at least one of a period indication parameter of a first signal cluster, a start transmission location indication parameter of the first signal cluster, a quantity indication parameter, or a frequency domain resource location indication parameter of the first signal cluster, and the first signal cluster includes at least one signal.

Optionally, the period indication parameter of the first signal cluster is used to indicate a period of the first signal cluster.

The period indication parameter includes an explicit period indication parameter and/or an implicit period indication parameter, the explicit period indication parameter indicates an index number of a period value of the first signal cluster, and the implicit period indication parameter indicates at least one of a quantity of first signal clusters in one paging period or a ratio of a quantity of first signal clusters in one paging period to a quantity of paging occasions.

Optionally, the start transmission location indication parameter of the first signal cluster is used to indicate a start transmission location of the first signal cluster in time domain.

The start transmission location indication parameter indicates a relative location of the start transmission location of the first signal cluster to a second paging occasion, and the second paging occasion is the $1^{st}$ paging occasion of at least one paging occasion corresponding to the first signal cluster.

Optionally, the quantity indication parameter is used to indicate at least one of a quantity of first signals in a paging period, a quantity of first signal clusters in a paging period, or a quantity of first signals in a first signal cluster.

The quantity parameter indicates at least one of: an index number of the quantity of first signals in the paging period, an index number of the quantity of first signal clusters in the paging period, an index number of the quantity of first signals in the first signal cluster, a ratio of a quantity of paging occasions in the paging period to the quantity of first signals, a ratio of a quantity of paging occasions in the paging period to the quantity of first signal clusters, or a ratio of a quantity of paging occasions in a period of the first signal cluster to the quantity of first signals.

Optionally, the frequency domain resource location indication parameter of the first signal is used to indicate a frequency domain resource location of the first signal.

The frequency domain resource location indication parameter includes an explicit frequency domain resource location indication parameter and/or an implicit frequency domain resource location indication parameter, the explicit frequency domain resource location indication parameter indicates an index number of the frequency domain resource location, and the implicit frequency domain resource location indication parameter indicates a relative location of the frequency domain resource location of the first signal to a frequency domain resource location of the first paging occasion.

Optionally, at least one signal in the first signal cluster is transmitted in a continuous time division manner or in a distributed time division manner.

Optionally, a time domain start location of the first resource is before a time domain start location of the first paging occasion; or a time domain start location of the first resource is the same as a time domain start location of the first paging occasion; and/or a frequency domain resource of the first resource is the same as a frequency domain resource corresponding to the first paging occasion; or there is a spacing between a frequency domain resource of the first resource and a frequency domain resource corresponding to the first paging occasion.

Optionally, the sending module 630 is further configured to:

send at least one element of the paging configuration parameter and/or at least one element of the first parameter set to the terminal device by using higher layer signaling.

According to this embodiment of this application, the network device 600 may perform the method on the network device side in the signal transmission method in the embodiments of this application. The foregoing and other operations and/or functions of the modules of the network device 600 are respectively used to implement corresponding procedures of the methods. For brevity, details are not described again.

Therefore, the network device 600 sends the first signal to the terminal device, where the first signal is used to indicate, to the terminal device, that there is or there is no paging scheduling information on the first paging occasion, so that the terminal device determines, based on the first signal, whether to listen on a downlink control channel, reducing power consumption of the terminal device.

Figure 7:
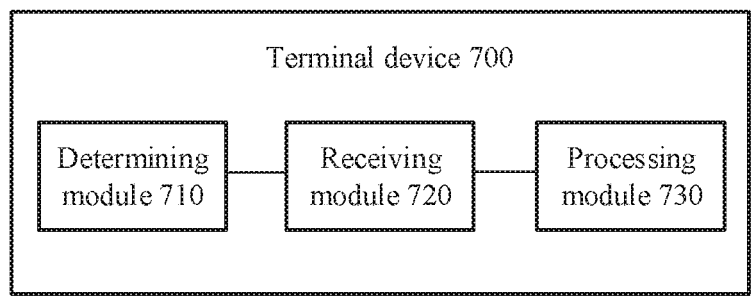
FIG. 7 is a schematic block diagram of a terminal device according to an embodiment of this application.

FIG. 7 is a schematic block diagram of a terminal device 700 according to an embodiment of this application. As shown in FIG. 7, the terminal device 700 includes:

a determining module 710, configured to determine a first resource based on at least one of a paging configuration parameter, a first parameter set, a terminal device identifier, or a terminal device identification code;

a receiving module 720, configured to receive, on the first resource, the first signal sent by a network device, where the first signal is used to indicate, to the terminal device, that there is or there is no paging scheduling information on a first paging occasion; and a processing module 730, configured to: determine, based on the first signal, whether to listen on a downlink control channel on the first paging occasion.

In this embodiment of this application, the terminal device 700 determines the first resource based on the at least one of the paging configuration parameter, the first parameter set, the terminal device identifier, or the terminal device identification code; receives, on the first resource, the first signal sent by the network device, where the first signal is used to indicate, to the terminal device, that there is or there is no paging scheduling information on the first paging occasion; and determines, based on the first signal, whether to listen on the downlink control channel, reducing power consumption of the terminal device.

Optionally, the paging configuration parameter includes at least one of a paging frame number, a paging period, a paging density, a paging frame quantity, or a quantity of paging occasions in a paging frame.

Optionally, the first parameter set includes at least one of a period indication parameter of a first signal cluster, a start transmission location indication parameter of the first signal cluster, a quantity indication parameter, or a frequency domain resource location indication parameter of the first signal cluster, and the first signal cluster includes at least one signal.

Optionally, the period indication parameter of the first signal cluster is used to indicate a period of the first signal cluster.

The period indication parameter includes an explicit period indication parameter and/or an implicit period indication parameter, the explicit period indication parameter indicates an index number of a period value of the first signal cluster, and the implicit period indication parameter indicates at least one of a quantity of first signal clusters in one paging period or a ratio of a quantity of first signal clusters in one paging period to a quantity of paging occasions.

Optionally, the start transmission location indication parameter of the first signal cluster is used to indicate a start transmission location of the first signal cluster in time domain.

The start transmission location indication parameter indicates a relative location of the start transmission location of the first signal cluster to a second paging occasion, and the second paging occasion is the $1^{st}$ paging occasion of at least one paging occasion corresponding to the first signal cluster.

Optionally, the quantity indication parameter is used to indicate at least one of a quantity of first signals in a paging period, a quantity of first signal clusters in a paging period, or a quantity of first signals in a first signal cluster.

The quantity parameter indicates at least one of: an index number of the quantity of first signals in the paging period, an index number of the quantity of first signal clusters in the paging period, an index number of the quantity of first signals in the first signal cluster, a ratio of a quantity of paging occasions in the paging period to the quantity of first signals, a ratio of a quantity of paging occasions in the paging period to the quantity of first signal clusters, or a ratio of a quantity of paging occasions in a period of the first signal cluster to the quantity of first signals.

Optionally, the frequency domain resource location indication parameter of the first signal is used to indicate a frequency domain resource location of the first signal.

The frequency domain resource location indication parameter includes an explicit frequency domain resource location indication parameter and/or an implicit frequency domain resource location indication parameter, the explicit frequency domain resource location indication parameter indicates an index number of the frequency domain resource location, and the implicit frequency domain resource location indication parameter indicates a relative location of the frequency domain resource location of the first signal to a frequency domain resource location of the first paging occasion.

Optionally, at least one signal in the first signal cluster is transmitted in a continuous tune division manner or in a distributed time division manner.

Optionally, a time domain start location of the first resource is before a time domain start location of the first paging occasion; or a time domain start location of the first resource is the same as a time domain start location of the first paging occasion; and/or a frequency domain resource of the first resource is the same as a frequency domain resource corresponding to the first paging occasion; or there is a spacing between a frequency domain resource of the first resource and a frequency domain resource corresponding to the first paging occasion.

Optionally, the receiving module is further configured to:

receive at least one element of the paging configuration parameter and/or least one element of the first parameter set sent by the network device by using higher layer signaling.

According to this embodiment of this application, the terminal device 700 may perform the method on the terminal device side in the signal transmission method according to the foregoing embodiment of this application. In addition, the foregoing and other operations and/or functions of the modules of the terminal device 700 are respectively used to implement corresponding procedures of the methods. For brevity, details are not described again.

Therefore, the terminal device 700 receives the first signal sent by the network device, where the first signal is used to indicate, to the terminal device, that there is or there is no paging scheduling information on the first paging occasion; and determines, based on the first signal, whether to listen on the downlink control channel, reducing power consumption of the terminal device.

Figure 8:
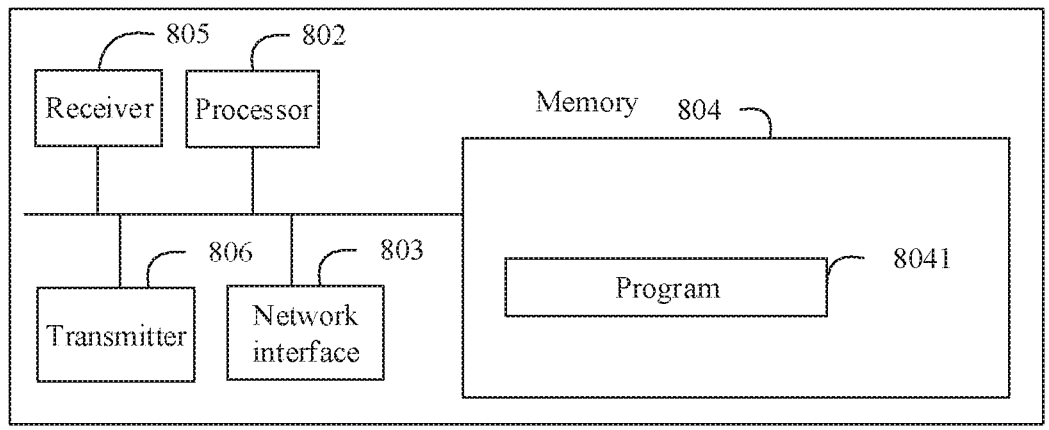
FIG. 8 is a structural block diagram of a network device according to an embodiment of this application.

FIG. 8 shows a structure of a network device according to an embodiment of this application. The network device includes at least one processor 802 (for example, a CPU), at least one network interface 803 or another communications interface, and a memory 804. Optionally, the network device may further include a receiver 805 and a transmitter 806. The processor 802 is configured to execute an executable module, for example, a computer program, stored in the memory 804. The memory 804 may include a high-speed random access memory RAM, and may also include a non-volatile memory (non-volatile memory), for example, at least one magnetic disk storage. The at least one network interface 803 (which may be wired or wireless) is used to implement a communication connection to at least one another network element. The receiver 805 and the transmitter 806 are configured to transmit various signals or information.

In some implementations, the memory 804 stores a program 8041. The program 8041 may be executed by the processor 802, and is used to perform the method on the network device side in the foregoing embodiment of this application.

Figure 9:
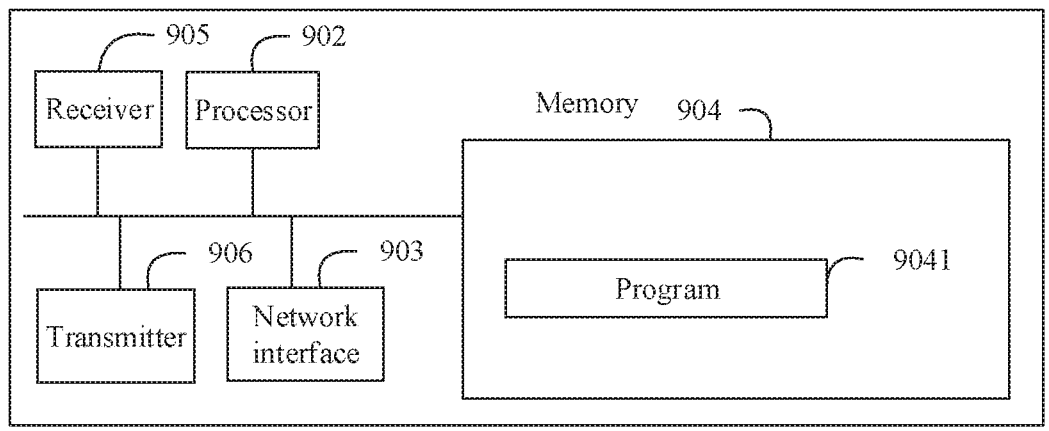
FIG. 9 is a structural block diagram of a terminal device according to an embodiment of this application.

FIG. 9 shows a structure of a terminal device according to an embodiment of this application. The terminal device includes at least one processor 902 (for example, a CPU), at least one network interface 903 or another communications interface, and a memory 904. Optionally, the terminal device may further include a receiver 905 and a transmitter 906. The processor 902 is configured to execute an executable module, for example, a computer program, stored in the memory 904. The memory 904 may include a high-speed random access memory RAM, and may also include a non-volatile memory (non-volatile memory), for example, at least one magnetic disk storage. The at least one network interface 903 (which may be wired or wireless) is used to implement a communication connection to at least one another network element. The receiver 905 and the transmitter 906 are configured to transmit various signals or information.

In some implementations, the memory 904 stores a program 9041. The program 9041 may be executed by the processor 902, and is used to perform the foregoing method on the terminal device side in the another embodiment of this application.

It should be understood that the term "and/or" in this specification describes only an association relationship for describing associated objects and indicates that three relationships may exist. For example, A and/or B may represent the following three cases: Only A exists, both A and B exist, and only B exists. In addition, the character "/" in this specification generally represents an "or" relationship between the associated objects.

It should further be understood that, in the embodiments of this application, sequence numbers of the foregoing processes do not mean execution sequences. The execution sequences of the processes should be determined based on functions and internal logic of the processes, and should not constitute any limitation on implementation processes of the embodiments of this application.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on a particular application and a design constraint of a technical solution. For specific applications, a person skilled in the art may use different methods to implement the described functions; however, this implementation should not be construed as going beyond the scope of the embodiments of this application.

It may be clearly understood by a person skilled in the art that, for convenience and brevity of description, for specific working processes of the foregoing system, apparatus, and unit, refer to corresponding processes in the foregoing method embodiments. Details are not described again.

In the several embodiments provided in the embodiments of this application, it should be understood that the disclosed system, apparatus, and method may be implemented in other manners. For example, the described apparatus embodiments are merely examples. For example, the unit division is merely logical function division, or may be other division in an actual implementation. For example, a plurality of units or components may be combined or integrated into another system, or some features may be ignored or may not be performed. In addition, displayed or discussed mutual couplings or direct couplings or communication connections may be indirect couplings or communication connections using some interfaces, apparatuses, or units, and may be in an electrical form, a mechanical form, or another form.

The units described as separate components may or may not be physically separate; and components displayed as units may or may not be physical units, in other words, the components may be located in one place, or may be distributed on a plurality of network units. Some or all of the units may be selected based on actual requirements to achieve the objective of the solutions in the embodiments.

In addition, functional units in the embodiments of the embodiments of the present application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, the part contributing to the prior art, or some of the technical solutions may be embodied in the form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or a compact disc.

The foregoing descriptions are merely specific implementations of the embodiments of this application, but are not intended to limit the protection scope of the embodiments of this application. Any variation or replacement readily figured out by a person skilled in the art within the technical scope disclosed in the embodiments of this application shall fall within the protection scope of the embodiments of this application. Therefore, the protection scope of the embodiments of this application shall be subject to the protection scope of the claims.

What is claimed is:

1. A signal transmission method, comprising:
   sending, by a network device, system information block (SIB), wherein the SIB comprises a quantity indication parameter, and wherein the quantity indication parameter indicates a ratio of a quantity of paging occasions in a paging period to a quantity of first signals in the paging period;
   generating a first signal, wherein the first signal is used to indicate a paging status of one or more terminal devices on one or more paging occasions;
   determining, by the network device, a first resource at least based on the quantity indication parameter; and
   sending, by the network device, the first signal to the one or more terminal devices on the first resource.

2. The method according to claim 1, wherein the first resource is further determined based on a paging configuration parameter, and wherein the paging configuration parameter comprises at least one of a paging frame number, a paging period, a paging density, a paging frame quantity, or a quantity of paging occasions in a paging frame.

3. The method according to claim 1, wherein the first resource is further determined based on a first parameter set, and wherein the first parameter set comprises at least one of a start transmission location indication parameter of a first signal cluster or the quantity indication parameter, and wherein the first signal cluster comprises at least the first signal.

4. The method according to claim 3, wherein the start transmission location indication parameter of the first signal cluster is used to indicate a start transmission location of the first signal cluster in time domain.

5. A signal transmission method, comprising:
   receiving, by a terminal device, system information block (SIB), wherein the SIB comprises a quantity indication parameter, and wherein the quantity indication parameter indicates a ratio of a quantity of paging occasions in a paging period to a quantity of first signals in the paging period;
   determining, by a terminal device, a first resource at least based on the quantity indication parameter;
   receiving, by the terminal device, a first signal on the first resource wherein the first signal is used to indicate a paging status of the terminal device on one or more paging occasions; and
   determining, by a terminal device, whether to listen on a downlink control channel on a first paging occasion according to the first signal.

6. The method according to claim 5, wherein the first resource is further determined based on a paging configuration parameter, and wherein the paging configuration parameter comprises at least one of a paging frame number, a paging period, a paging density, a paging frame quantity, or a quantity of paging occasions in a paging frame.

7. The method according to claim 5, wherein the first resource is further determined based on a first parameter set, and wherein the first parameter set comprises at least one of a start transmission location indication parameter of a first signal cluster or the quantity indication parameter, and wherein the first signal cluster comprises at least the first signal.

8. The method according to claim 7, wherein the start transmission location indication parameter of the first signal cluster is used to indicate a start transmission location of the first signal cluster in time domain.

9. A communication device, comprising:
   at least one processor; and
   a memory storing instructions executable by the at least one processor, wherein the instructions, when executed by the at least one processor, instruct the at least one processor to:
      send system information block (SIB), wherein the SIB comprises a quantity indication parameter, and wherein the quantity indication parameter indicates a ratio of a quantity of paging occasions in a paging period to a quantity of first signals in the paging period;

generate a first signal, wherein the first signal is used to indicate a paging status of one or more terminal devices on one or more paging occasions;

determine a first resource at least based on the quantity indication parameter; and send the first signal to the one or more terminal devices on the first resource.

10. The device according to claim 9, wherein the first resource is further determined based on a paging configuration parameter, and wherein the paging configuration parameter comprises at least one of a paging frame number, a paging period, a paging density, a paging frame quantity, or a quantity of paging occasions in a paging frame.

11. The device according to claim 9, wherein the first resource is further determined based on a first parameter set, and wherein the first parameter set comprises at least one of a start transmission location indication parameter of a first signal cluster or the quantity indication parameter, and wherein the first signal cluster comprises at least the first signal.

12. The device according to claim 11, wherein the start transmission location indication parameter of the first signal cluster is used to indicate a start transmission location of the first signal cluster in time domain.

13. A communication device, comprising:

at least one processor;

a memory storing instructions executable by the at least one processor, wherein the instructions, when executed by the at least one processor, instruct the at least one processor to:

receive system information block (SIB), wherein the SIB comprises a quantity indication parameter, and wherein the quantity indication parameter indicates a ratio of a quantity of paging occasions in a paging period to a quantity of first signals in the paging period;

determine a first resource at least based on the quantity indication parameter;

receive, on the first resource, a first signal on the first resource, wherein the first signal is used to indicate a paging status of the communication device on one or more paging occasions; and determine, based on the first signal, whether to listen on a downlink control channel on a first paging occasion.

14. The device according to claim 13, wherein the first resource is further determined based on a paging configuration parameter, and wherein the paging configuration parameter comprises at least one of a paging frame number, a paging period, a paging density, a paging frame quantity, or a quantity of paging occasions in a paging frame.

15. The device according to claim 13, wherein the first resource is further determined based on a first parameter set, and wherein the first parameter set comprises at least one of a start transmission location indication parameter of a first signal cluster, or the quantity indication parameter, and wherein the first signal cluster comprises at least the first signal.

16. The device according to claim 15, wherein the start transmission location indication parameter of the first signal cluster is used to indicate a start transmission location of the first signal cluster in time domain.

17. The method according to claim 4, wherein the start transmission location indication parameter indicates a relative location of the start transmission location of the first signal cluster to a second paging occasion, and wherein the second paging occasion is a first paging occasion of at least one paging occasion corresponding to the first signal cluster.

18. The method according to claim 8, wherein the start transmission location indication parameter indicates a relative location of the start transmission location of the first signal cluster to a second paging occasion, and wherein the second paging occasion is a first paging occasion of at least one paging occasion corresponding to the first signal cluster.

19. The device according to claim 12, wherein the start transmission location indication parameter indicates a relative location of the start transmission location of the first signal cluster to a second paging occasion, and wherein the second paging occasion is a first paging occasion of at least one paging occasion corresponding to the first signal cluster.

20. The device according to claim 16, wherein the start transmission location indication parameter indicates a relative location of the start transmission location of the first signal cluster to a second paging occasion, and wherein the second paging occasion is a first paging occasion of at least one paging occasion corresponding to the first signal cluster.

* * * * *

UNITED STATES PATENT AND TRADEMARK OFFICE
CERTIFICATE OF CORRECTION

PATENT NO. : 11,445,472 B2
APPLICATION NO. : 16/700530
DATED : September 13, 2022
INVENTOR(S) : Tong Ji et al.

It is certified that error appears in the above-identified patent and that said Letters Patent is hereby corrected as shown below:

In the Claims

In Column 36, In Line 33, In Claim 5, delete "a" and insert -- resource, --.

In Column 36, In Line 36, In Claim 5, delete "resource" and insert -- resource, --.

In Column 36, In Line 39, In Claim 5, delete "a" and insert -- the --.

In Column 38, In Line 13, In Claim 15, delete "cluster," and insert -- cluster --.

Signed and Sealed this
Twenty-seventh Day of June, 2023

Katherine Kelly Vidal
*Director of the United States Patent and Trademark Office*